(12) United States Patent
Moser et al.

(10) Patent No.: US 7,206,964 B2
(45) Date of Patent: Apr. 17, 2007

(54) CONSISTENT ASYNCHRONOUS CHECKPOINTING OF MULTITHREADED APPLICATION PROGRAMS BASED ON SEMI-ACTIVE OR PASSIVE REPLICATION

(75) Inventors: Louise E. Moser, Santa Barbara, CA (US); Peter M. Melliar-Smith, Santa Barbara, CA (US)

(73) Assignee: Availigent, Inc., San Jose, CA (US)

( * ) Notice: Subject to any disclaimer, the term of this patent is extended or adjusted under 35 U.S.C. 154(b) by 589 days.

(21) Appl. No.: 10/651,757

(22) Filed: Aug. 30, 2003

(65) Prior Publication Data

US 2005/0034014 A1    Feb. 10, 2005

Related U.S. Application Data

(60) Provisional application No. 60/407,585, filed on Aug. 30, 2002.

(51) Int. Cl.
*G06F 11/00* (2006.01)
(52) U.S. Cl. ............................ 714/13; 714/12; 714/6
(58) Field of Classification Search ............... 714/12
See application file for complete search history.

(56) References Cited

U.S. PATENT DOCUMENTS

| | | | | |
|---|---|---|---|---|
| 5,257,381 | A * | 10/1993 | Cook | 719/318 |
| 5,440,726 | A * | 8/1995 | Fuchs et al. | 714/20 |
| 5,794,034 | A * | 8/1998 | Harinarayan et al. | 718/102 |
| 5,799,146 | A * | 8/1998 | Badovinatz et al. | 714/4 |
| 5,802,265 | A * | 9/1998 | Bressoud et al. | 714/11 |
| 5,802,267 | A * | 9/1998 | Shirakihara et al. | 714/15 |
| 5,941,999 | A * | 8/1999 | Matena et al. | 714/6 |
| 5,956,489 | A * | 9/1999 | San Andres et al. | 709/221 |
| 6,338,147 | B1 * | 1/2002 | Meth et al. | 714/13 |
| 6,539,446 | B1 * | 3/2003 | Chan | 710/200 |
| 6,928,577 | B2 * | 8/2005 | Moser et al. | 714/4 |
| 2002/0032883 | A1 * | 3/2002 | Kampe et al. | 714/16 |
| 2005/0229035 | A1 * | 10/2005 | Peleska et al. | 714/12 |

OTHER PUBLICATIONS

Stallings, William; Operating Systems, Third Edition, published 1998, pp. 72, 276-277.*
Y. Huang and C.M.R. Kintala; Software Implemented Fault Tolerance: Technologies and Experience, Proceedings of the IEEE 23rd International Symposium on Fault-Tolerant Computing, Toulouse, France, Jun. 1993, pp. 2-9.*
J. Srouji, P. Schuster, M. Bach and Y. Kuzmin; A Transparent Checkpoint Facility on NT, Proceedings of the 2nd USENIX Windows NT Symposium, Seattle, WA, Aug. 1998, pp. 77-85.*
M. Kasbekar and C.R. Das; Selective Checkpointing and Rollbacks in Multithreaded Distributed Systems, Proceedings fo the IEEE 21st International Conference on Distributed Computing Systems, Mesa, AZ, Apr. 2001, pp. 39-46.*
W. R. Dieter and J. E. Lumpp, Jr.; User-level checkpointing for LinuxThreads programs, Proceedings of the FREENIX Track, USENIX Annual Technical Conference, Boston, MA, Jun. 2001, pp. 81-92.*

* cited by examiner

Primary Examiner—Scott Baderman
Assistant Examiner—Joshua Lohn
(74) Attorney, Agent, or Firm—John P. O'Banion

(57) ABSTRACT

A method and mechanisms for checkpointing objects, processes and other components of a multithreaded application program, based on the leader-follower strategy of semi-active or passive replication, where it is not possible to stop and checkpoint all of the threads of the object, process or other component simultaneously. Separate checkpoints are generated for the local state of each thread and for the data that are shared between threads and are protected by mutexes. The invention enables different threads to be checkpointed at different times in such a way that the checkpoints restore a consistent state of the threads between the existing replicas and a new or recovering replica, even though the threads operate concurrently and asynchronously. The checkpoint of the shared data is piggybacked onto regular messages along with ordering information that determines the order in which the mutexes are granted to the threads.

75 Claims, 17 Drawing Sheets

US 7,206,964 B2

CONSISTENT ASYNCHRONOUS CHECKPOINTING OF MULTITHREADED APPLICATION PROGRAMS BASED ON SEMI-ACTIVE OR PASSIVE REPLICATION

CROSS-REFERENCE TO RELATED APPLICATIONS

This application claims priority from U.S. provisional application Ser. No. 60/407,585 filed on Aug. 30, 2002, incorporated herein by reference.

INCORPORATION-BY-REFERENCE OF MATERIAL SUBMITTED ON A COMPACT DISC

Not Applicable

STATEMENT REGARDING FEDERALLY SPONSORED RESEARCH OR DEVELOPMENT

This invention was made with Government support under Grant No. 70NANBOH3015 awarded by the US Department of Commerce, National Institute of Standards & Technology. The Government has certain rights in this invention.

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the public file or record of the United States Patent and Trademark Office, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND OF THE INVENTION

1. Field of the Invention

The invention relates generally to software-based fault-tolerant computer systems and, more specifically, to checkpointing and restoration of the states of the threads of objects, processes or other components of multithreaded application programs that are replicated using semi-active or passive replication.

2. Incorporation by Reference

The following patent and publications are incorporated herein by reference:

Patents

U.S. Pat. No. 4,665,520
U.S. Pat. No. 5,301,309
U.S. Pat. No. 5,440,726
U.S. Pat. No. 5,630,047
U.S. Pat. No. 5,802,267
U.S. Pat. No. 6,338,147

Publication

R. E. Strom and S. Yemini, Optimistic recovery in distributed systems, ACM Transactions on Computer Systems, vol. 3, no. 3, August 1985, pp. 204–206.

R. Koo and S. Toueg, Checkpointing and rollback-recovery in distributed systems, IEEE Transactions on Software Engineering, vol. SE-13, no. 1, January 1987, pp. 23–31.

B. Bhargava and S. Lian, Independent and concurrent rollback for recovery in distributed systems—An optimistic approach, Proceedings of the IEEE 7th Symposium on Reliable Distributed Systems, Columbus, Ohio., October 1988, pp. 3–12.

E. N. Elnozahy, D. B. Johnson and W. Zwaenepoel, The performance of consistent checkpointing, Proceedings of the IEEE 11th Symposium on Reliable Distributed Systems, Houston, Tex., October 1992, pp. 39–47.

Y. Huang and C. M. R. Kintala, Software implemented fault tolerance: Technologies and experience, Proceedings of the IEEE 23rd International Symposium on Fault-Tolerant Computing, Toulouse, France, June 1993, pp. 2–9.

J. S. Plank, M. Beck, G. Kingsley and K. Li, Libckpt: Transparent checkpointing under Unix, Proceedings of the USENIX Winter 1995 Technical Conference, New Orleans, La., January 1995, pp. 213–224.

J. Srouji, P. Schuster, M. Bach and Y. Kuzmin, A transparent checkpoint facility on NT, Proceedings of the 2nd USENIX Windows NT Symposium, Seattle, Wash., August 1998, pp. 77–85.

O. P. Damani, A. Tarafdar and V. K. Garg, Optimistic recovery in multi-threaded distributed systems, Proceedings of the IEEE 18th Symposium on Reliable Distributed Systems, Lausanne, Switzerland, October 1999, pp.234–243.

K. Whisnant, Z. Kalbarczyk and R. K. Iyer, Micro-checkpointing: Checkpointing of multithreaded applications, Proceedings of the IEEE International On-Line Testing Workshop, Palma de Mallorca, Spain, July 2000, pp. 3–8.

M. Kasbekar and C. R. Das, Selective checkpointing and rollbacks in multithreaded distributed systems, Proceedings of the IEEE 21st International Conference on Distributed Computing Systems, Mesa, Ariz., April 2001, pp. 39–46.

W. R. Dieter and J. E. Lumpp, Jr., User-level checkpointing for LinuxThreads programs, Proceedings of the FREENIX Track, USENIX Annual Technical Conference, Boston, Mass., June 2001, pp. 81–92.

C. D. Carothers and B. K. Szymanski, Checkpointing multithreaded programs, Dr. Dobb's Journal, vol. 27, issue 8, August 2002, pp. 46–51.

3. Description of Related Art

Fault-tolerant computer systems are based on entity redundancy (replication) to mask faults and, thus, to provide continuous service to their users. In software fault tolerance, the entities that are replicated are the processes, objects or other components of the application programs. Distributed systems provide the opportunity for fault tolerance by allowing replicas of such entities to be hosted on different computers. In distributed computing, a client invokes a method of a server by sending a request message containing the method invocation to that server and by receiving a reply message containing the response from that server. In a fault-tolerant distributed computer system, the server is replicated, but the client may also be replicated, particularly in a multi-tier or peer-to-peer application.

Checkpointing plays an important part in the design and implementation of fault-tolerant computer systems, as is well known in the prior art. The state of a process, object or other component is extracted and is stored as a checkpoint. Subsequently, the checkpoint is used to restore the state of a process, object or component on the same or a different computer. Checkpointing has had a long history, much of which concerns the checkpointing of one or more processes. However, little of that history concerns the checkpointing of the threads of a process, object or other components of a multithreaded application program.

Most prior work on multithreaded checkpointing relies on a technique called barrier synchronization that suspends all of the threads of a process and then checkpoints the entire process. The disadvantage of that approach is that, in general, it is not possible to suspend all of the threads at a moment in time without interrupting the service provided by the application. Furthermore, there might never occur a moment in time at which all of the threads are naturally quiescent and can be checkpointed together.

Replication Strategies

Fault-tolerant systems support different replication strategies, including active, semi-active and passive replication.

In active replication all of the replicas are equal, and all of them execute the methods invoked on the replicated object. The order in which messages are processed, and the order in which mutexes are granted are determined competitively and the replicas agree on that order.

In semi-active and passive replication one of the replicas is distinguished as the primary replica and the other replicas are backup replicas. The primary replica acts as the leader that makes the decisions about the order in which messages are processed and the order in which mutexes are granted, and communicates those decisions to the backup replicas, which act as followers that follow the decisions of the leader.

In semi-active replication, the backup replicas are running concurrently with, but slightly behind, the primary replica. A backup replica processes all operations that the primary replica processes, and derives its state from its own processing of those operations. Consequently, it does not need to obtain its state from a checkpoint. However, a new or recovering backup replica must obtain its initial state from a checkpoint. Once it has obtained that initial state from a checkpoint, it can itself process operations as described above.

In passive replication, a backup replica does not process operations unless the primary replica fails, at which time the backup replica is promoted to become the new primary replica. Before operating as the new primary replica the backup replica establishes its state from the checkpoint, which was recorded by the primary replica before it failed, and then starts processing operations as the new primary replica.

Strong Replica Consistency

A challenging aspect of replication is to maintain strong replica consistency, as methods are invoked on the replicas, states of the replicas change dynamically, and as faults occur. Strong replica consistency means that, for each method invocation or operation, for each data access within said method invocation or operation, the replicas obtain the same values for the data. Moreover, for each result, message sent, or request made to other processes, objects or components, the replicas generate the same result, message or request.

Description of Related Work

The fundamental papers on checkpointing within distributed systems include R. E. Strom and S. Yemini, Optimistic recovery in distributed systems, ACM Transactions on Computer Systems, vol. 3, no. 3, August 1985, pp. 204–206, incorporated herein by reference; R. Koo and S. Toueg, Checkpointing and rollback-recovery in distributed systems, IEEE Transactions on Software Engineering, vol. SE-13, No. 1, January 1987, pp. 23–31, incorporated herein by reference; and B. Bhargava and S. Lian, Independent and concurrent rollback for recovery in distributed systems—An optimistic approach, Proceedings of the IEEE 7th Symposium on Reliable Distributed Systems, Columbus, Ohio., October 1988, pp. 3–12, incorporated herein by reference.

None of those papers provides mechanisms for checkpointing multithreaded application programs.

In U.S. Pat. No. 4,665,520, incorporated herein by reference, and also in R. E. Strom and S. Yemini, Optimistic recovery in distributed systems, ACM Transactions on Computer Systems, vol. 3, no. 3, August 1985, pp. 204–206, incorporated herein by reference, Strom and Yemini disclose a scheme for asynchronous checkpointing of processes in a distributed system, in which received messages are logged to prevent cascade rollback. The scheme employs a dependency tracking mechanism to maintain a consistent system-wide state of multiple processes within the distributed system and to ensure that causal dependency relationships among messages are maintained. However, that technique does not address asynchronous checkpointing of multi-threaded processes.

U.S. Pat. No. 5,440,726 which is incorporated herein by reference discloses a progressive retry method and apparatus for checkpointing and recovery for multi-process message-passing applications, incorporated herein by reference. A central checkpoint coordinator and a central recovery coordinator are used to obtain and restore, respectively, a set of globally consistent checkpoints across multiple processes within a distributed system.

U.S. Pat. No. 5,630,047, which is incorporated herein by reference, also addresses the need to maintain consistent global checkpoints of processes in a distributed system. That patent introduces the notions of a maximum consistent global checkpoint and of minimum consistent global checkpoint sets. When a fault occurs, each of the processes is rolled back to a checkpoint in the maximum consistent global checkpoint set. If the same fault occurs again, each of the processes is rolled back to a checkpoint in the minimum consistent global checkpoint set. A rollback dependency graph is employed to determine the maximum and minimum consistent global checkpoints, but does not address multi-threaded processes.

U.S. Pat. No. 5,802,267, which is incorporated herein by reference, discloses mechanisms that perform a checkpoint by stopping communication between processes on different computers, while allowing normal processing and communication between processes on the same computer. The technique described in that patent involves a checkpoint command process that starts (and stops) the checkpointing of each process, and that commands each process to stop (and start) communicating with other processes. It allows a process on one computer to continue executing while a process on another computer is being checkpointed, but does not allow a thread of an object, process or other component on one computer to continue executing while a thread of the same object, process or other component on the same computer is being checkpointed.

U.S. Pat. No. 6,338,147, which is incorporated herein by reference, teaches checkpointing of processes in a parallel program. Each process of the program is responsible for taking its own checkpoint and for initiating its own restart.

In U.S. Pat. No. 5,301,309, which is incorporated herein by reference, processes external to the application program are responsible for checkpointing and restarting the application program.

In E. N. Elnozahy, D. B. Johnson and W. Zwaenepoel, The performance of consistent checkpointing, Proceedings of the IEEE 11th Symposium on Reliable Distributed Systems, Houston, Tex., October 1992, pp. 39–47, incorporated herein by reference, Elnozahy et. al. describe methods for checkpointing multiple processes that communicate with each other by message passing. Each process is checkpointed independently, and then a consistent set of checkpoints is determined, from which the computation can be restarted. That paper does not address multithreaded processes where data are shared between threads within a process.

The libft checkpointing library (Y. Huang and C. M. R. Kintala, Software implemented fault tolerance: Technologies and experience, Proceedings of the IEEE 23rd International Symposium on Fault-Tolerant Computing, Toulouse, France, June 1993, pp. 2–9, incorporated herein by reference) requires the programmer to specify critical data structures and their association with the threads of the application program, and the programmer is responsible for ensuring the correctness of state after a rollback.

The libckpt checkpointing library (J. S. Plank, M. Beck, G. Kingsley and K. Li, Libckpt: Transparent checkpointing under Unix, Proceedings of the
USENIX Winter 1995 Technical Conference, New Orleans, La., January 1995, pp. 213–224, incorporated herein by reference) supports asynchronous (forked) checkpointing, incremental checkpointing, memory exclusion and user-directed checkpointing. However, it does not support the checkpointing of multithreaded processes.

Srouji et. al. (J. Srouji, P. Schuster, M. Bach and Y. Kuzmin, A transparent checkpoint facility on NT, Proceedings of the USENIX 2nd Windows NT Symposium, Seattle, Wash., August 1998, pp. 77–85, incorporated herein by reference) describe a checkpointing library for Windows/NT, which also works on UNIX (AIX and FreeBSD) platforms. The facility checkpoints an entire process, by suspending all threads within the process, which is problematic for threads that are in the middle of system calls. The checkpointing of entire processes also has an adverse affect on performance.

Damini et. al. (O. P. Damani, A. Tarafdar and V. K. Garg, Optimistic recovery in multi-threaded distributed systems, Proceedings of the IEEE 18th Symposium on Reliable Distributed Systems, Lausanne, Switzerland, October 1999, pp. 234–243, incorporated herein by reference) extend the optimistic recovery algorithm of Strom and Yemini, described above, to multithreaded programs by accounting for individual threads using a distributed dependency-tracking mechanism. Their strategy is based on message-passing communication and dependencies that arise from messages.

In the micro-checkpointing strategy of (K. Whisnant, Z. Kalbarczyk and R. K. Iyer, Micro-checkpointing: Checkpointing of multithreaded applications, Proceedings of the IEEE International On-Line Testing Workshop, Palma de Mallorca, Spain, July 2000, pp. 3–8, incorporated herein by reference), checkpoints are not process-wide, and threads do not need to be suspended to take a checkpoint. Micro-checkpointing is defined in terms of micro-operations, which result from flattening the conventional nested control flow of a program into sequential micro-operations, each of which must be individually locked. There is no concept of shared data in the micro-checkpointing strategy. The micro-checkpointing mechanisms maintain a checkpoint buffer in which a micro-operation stores its state on entry into the micro-operation. Different threads can update their parts of the checkpoint buffer concurrently. After every message transmission, the mechanisms commit the checkpoint buffer to stable storage, which can be fairly expensive from a resource standpoint. No updates to the checkpoint buffer are allowed while the checkpoint is being saved.

Kasbekar and Das (M. Kasbekar and C. R. Das, Selective checkpointing and rollbacks in multithreaded distributed systems, Proceedings of the IEEE 21st International Conference on Distributed Computing Systems, Mesa, Ariz., April 2001, pp. 39–46, incorporated herein by reference) focus on checkpoints and rollbacks in multithreaded object-oriented distributed systems based on non-blocking coordinated checkpointing and on message passing. They use a dependency-tracking mechanism in which any object can initiate a selective checkpoint. The dependency-tracking mechanism tracks messages to identify the threads and objects that depend on the initiator. The rollback protocol of that invention is a coordinator-based two-phase protocol, and the invention determines a recovery line when the checkpoint is restored.

The checkpointing library for LinuxThreads described in (W. R. Dieter and J. E. Lumpp, Jr., User-level checkpointing for LinuxThreads programs, Proceedings of the FREENIX Track, USENIX Annual Technical Conference, Boston, Mass., June 2001, pp. 81–92, incorporated herein by reference), essentially checkpoints the entire binary image of a process, including the process address space, thread registers, thread library state, signal handlers and open file descriptors. To checkpoint a process, the checkpointing library blocks all threads of the process, except the main thread, to prevent the threads from changing the process's state while it is being saved. The checkpointing library for LinuxThreads does not work in the general case where processes on the same or different computers communicate with each other.

Carothers and Szymanski (C. D. Carothers and B. K. Szymanski, Checkpointing multithreaded programs, Dr. Dobb's Journal, vol. 27, issue 8, August 2002, pp. 46–51, incorporated herein by reference) have also developed a checkpointing strategy for multiple threads. Like Dieter and Lumpp, but unlike the current invention, Carothers and Szymanski stop all threads in a process to take a checkpoint. Their innovation is the manner in which they use the do_fork( ) function to copy the memory space so that the threads can continue to execute while the checkpoint is being recorded.

From the foregoing discussion, it can be seen that there is a need to provide checkpointing and restoration of the threads of a process, object or other component within a multithreaded application program replicated using semi-active or passive replication. There is also a need to provide checkpointing that does not require suspending all threads at a moment in time, which leads to service interruption.

BRIEF SUMMARY OF THE INVENTION

The present invention satisfies the foregoing needs by allowing individual threads of a process, object or other component to be individually checkpointed while providing consistent restoration of thread state, and overcomes additional deficiencies with regard to current approaches. An aspect of the present invention is a method and mechanisms for checkpointing an object, process or other component of a multithreaded application program that is replicated using the leader-follower approach of semi-active or passive replication, where it is not possible to stop and checkpoint all of the threads of an object, process or other component simultaneously. Another aspect of the invention is the generation of separate checkpoints for the local state of each thread and for data that are shared by threads and are protected by mutexes.

The preferred embodiment of the invention employs a multithreading library referred to herein as a Consistent Multithreading (CMT) library, along with CMT mechanisms which ensure that, when an object is replicated, the mutexes are granted to the corresponding threads in the replicas in the same order. The CMT library contains wrapper functions for the functions of the operating system thread library that claim and release mutexes, semaphores, condition variables and so forth, and is interposed ahead of the operating system thread library. When the application program invokes the claim( ) and releases( ) functions, it actually invokes the claim( ) and releases( ) wrapper functions of the CMT library, which in turn invoke the corresponding functions of the operating system thread library.

In the present invention the CMT claim( ) wrapper function generates checkpoints for shared data, and restores the values of the shared data from the checkpoints. The invention teaches how the checkpoint information for shared data is associated with the mutex ordering information that defines the order in which mutexes are granted to threads, and is piggybacked with that ordering information onto regular messages, thus avoiding the transmission of additional messages to carry checkpoint information.

The invention distinguishes between an invoked-checkpoint thread, for which the checkpoint infrastructure invokes a method for getting thread state, herein referred to as the get_thread_state( ) method, of the thread to obtain the checkpoint of the thread, and a self-checkpointing thread, which itself determines the need to generate a checkpoint and to invoke a method for recording thread state, herein referred to as the record_thread_state( ) method of the checkpoint infrastructure.

For each object, the checkpoint infrastructure maintains an objectCheckpointNumber that it increments when it initiates a new checkpoint of the object. The objectCheckpointNumber is written only by the checkpoint infrastructure, and is read by the threads of the object. Each thread maintains a threadCheckpointNumber corresponding to its most recently recorded checkpoint. Each mutex that protects shared data maintains a mutexCheckpointNumber corresponding to its most recently recorded checkpoint.

A self-checkpointing thread compares its threadCheckpointNumber with the objectCheckpointNumber. If the threadCheckpointNumber is less than the objectCheckpointNumber, the thread generates a checkpoint.

When a thread invokes the CMT claim( ) function for a mutex, the CMT claim( ) function compares its mutexCheckpointNumber with the threadCheckpointNumber of the thread that is claiming the mutex. If the mutexCheckpointNumber is less than the threadCheckpointNumber, the CMT claim( ) function records a checkpoint for the shared data. If the mutexCheckpointNumber is greater than or equal to the threadCheckpointNumber, no checkpoint is required.

The invention employs a checkpoint data structure that allows a self-checkpointing thread to record data that are part of a checkpoint. The checkpoint data structure allows a self-checkpointing thread to restore the values of its local attributes and variables subsequently.

Even more difficult, for a self-checkpointing thread, is recording, and subsequently recreating, the current position of the thread in its flow of control. If the thread is within a nested method invocation, the checkpoint must record that method invocation and its parameters, as well as values of the local variables of that method invocation. When restarting from a checkpoint, the thread must enter the nested method invocation, setting the values of the parameters and of the local variables from the checkpoint. This invention introduces a tool that assists the application programmer in the creation of code for self-checkpointing threads.

The checkpointing mechanisms of the invention avoid the "domino effect" that has hampered asynchronous checkpointing in the prior art, by recording the interactions between objects, threads and shared data in the checkpoint, so that those interactions can be replayed during restart.

Systems that provide checkpointing of processes in a parallel program have been proposed, wherein each process is responsible for taking its own checkpoint and for initiating its own restart as the entire process checkpoints itself. In the present invention, however, only the self-checkpointing threads take their own checkpoints and the entire process need not checkpoint itself.

The present invention utilizes shared data with checkpoints that need not be process-wide, and threads that do not need to be suspended to take a checkpoint. The present invention does not require flattening conventional nested control flow into sequential micro-operations that must be individually locked, and does not require maintaining a checkpoint buffer in which a micro-operation stores its state on entry into each micro-operation. The invention does not require the resource intensive process of committing the checkpoint buffer to stable storage after every message transition.

The present invention is directed at checkpoints and rollbacks in multithreaded object-oriented distributed systems based on shared data and non-blocking coordinated checkpointing, which does not rely on a message passing approach. Dependency-tracking mechanisms that track messages to identify the threads and objects that depend on the initiator are not required in the present invention which utilizes mutex locking.

Unlike some prior approaches, the present invention does not require checkpointing the entire binary image of a process, including the process address space, thread registers, thread library state, signal handlers and open file descriptors. Other approaches require the checkpointing library to block all threads of the process, except the main thread, to prevent the threads from changing the process's state while it is being saved. That approach is not applicable to the general case where processes on the same or different computers communicate with each other. The present invention, by contrast, checkpoints the local data of individual threads, as well as the data shared between threads, in an asynchronous manner. Some prior approaches require stopping all threads in a process to take a checkpoint, which is not a requirement in the present invention.

An aspect of the invention is to maintain strong replica consistency.

Another aspect of the invention is to maintain consistent asynchronous checkpointing within multithreaded application programs subject to semi-active or passive replication.

Another aspect of the invention is to support fault-tolerant computing within a distributed environment.

Another aspect of the invention is to allow threads of objects, processes or other components of multithreaded application programs to be efficiently checkpointed and restored.

Another aspect of the invention is to perform checkpointing without the need to suspend all threads of a process.

Another aspect of the invention is to allow different threads to be checkpointed at different times.

Another aspect of the invention is to perform checkpointing of threads that access shared data through mutexes.

Another aspect of the invention is to provide a checkpointing method for passive replication in which a backup replica obtains checkpoints for the threads relative to the order in which the threads claim and release mutexes.

Another aspect of the invention is to provide a checkpointing method for semi-active replication wherein a new or recovering backup replica obtains checkpoints for the threads relative to the order in which the threads claim and release mutexes.

Another aspect of the invention is to provide checkpoints for threads and shared data for two kinds of data (state), private thread state and shared data.

Another aspect of the invention is to support three kinds of threads, stateless threads, invoked-checkpoint threads and self-checkpointing threads.

Another aspect of the invention is to provide for incrementally checkpointing the threads of an object incrementally even while the threads are executing.

According to a further aspect of the invention, wrapper functions are utilized, such as within a Consistent Multithreading (CMT) library, for generating checkpoints for shared data, and restoring values of shared data from checkpoints, in response to executing wrapper functions, such as the CMT claim( ) function.

Further aspects of the invention will be brought out in the following portions of the document, wherein the detailed description is for the purpose of fully disclosing preferred embodiments of the invention without placing limitations thereon.

BRIEF DESCRIPTION OF THE DRAWINGS

The above and further advantages of the invention can be better understood by referring to the following description in conjunction with the accompanying drawings, in which.

DETAILED DESCRIPTION OF THE PREFERRED EMBODIMENT

Figure 1:
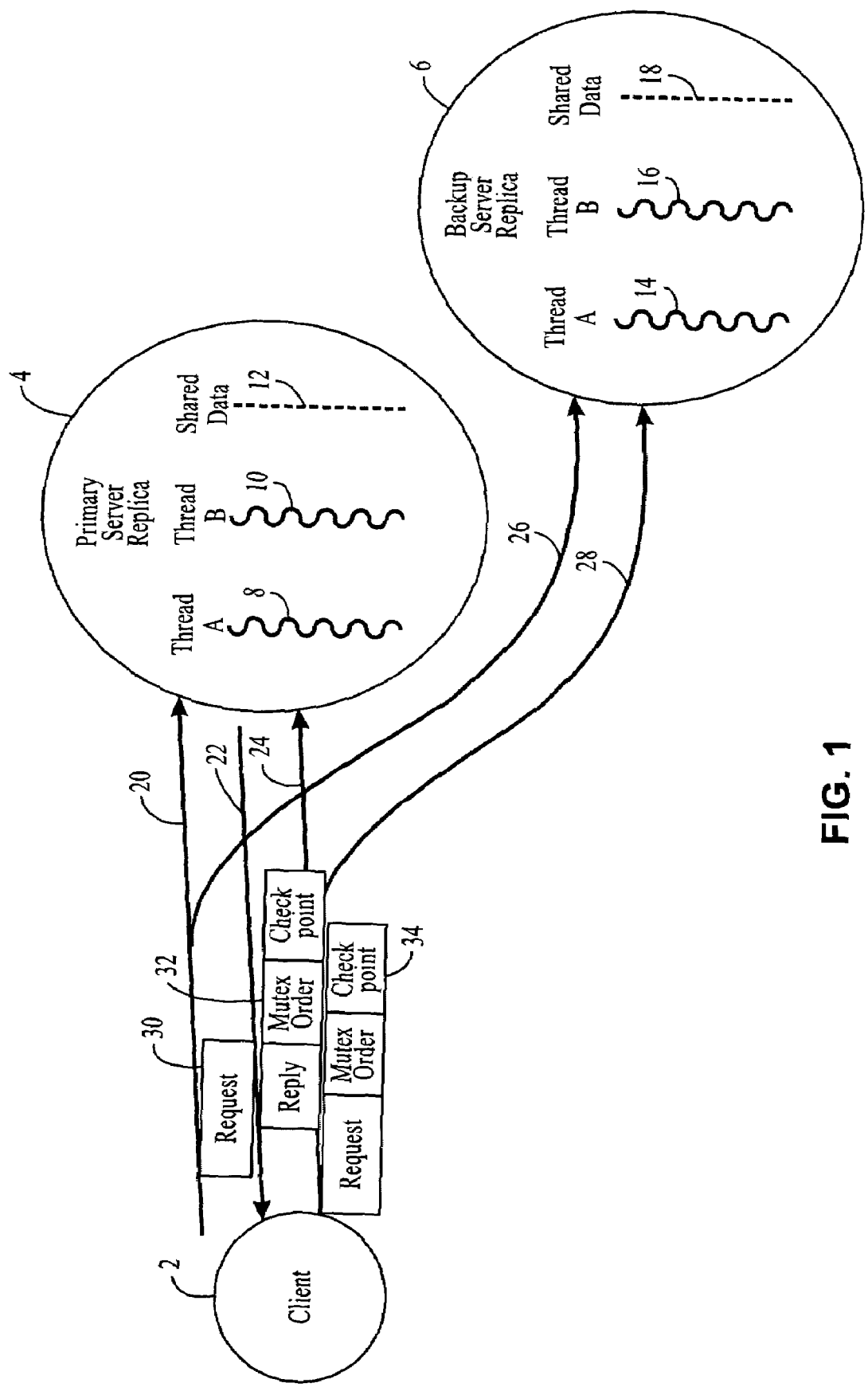
FIG. 1 is a diagram of an unreplicated client and of a primary server replica and a backup server replica according to an aspect of the present invention, showing threads sharing data and requests of the client, and replies of the server containing piggybacked ordering and checkpoint information.

The context in which this invention is described is a multithreaded application program that is distributed on multiple computers within a network of computers. The term "object" is used to mean an object, process or other component of the application program. In the preferred embodiment of the invention, the checkpoints are transmitted across the network and are stored in the main memory of a remote computer, although they may be stored in the main memory of the local computer, recorded in a message log, or written to a local or remote disk.

The invention disclosed herein allows different threads in a process to be checkpointed at different times so that the checkpoints restore a consistent state of the threads, even though the threads operate concurrently and asynchronously.

The invention is described in terms of an application that consists of one or more objects. The term object is used herein to refer generally to an object, process or other component of an application program. Each executing object consists of one or more threads. Threads communicate with each other, either by accessing shared data or by invoking methods that are communicated in messages, the ordering and delivery of which are controlled by the replication infrastructure.

When threads access shared data, it is necessary to prevent two threads from accessing the shared data at the same time because simultaneous access can produce unpredictable results. The mechanism used to prevent simultaneous access to the shared data is called a mutex, which provides mutually exclusive access to shared data by means of claim( ) and release( ) functions. Each element of shared data preferably has associated with it a mutex. When a thread invokes the claim( ) function for a mutex and is granted its claim to the mutex, the mutex provides exclusive access to the shared data until the thread invokes the release( ) function. If a second thread invokes the claim( ) function for the mutex during the period of exclusive access, the second thread must wait until the first thread invokes the relea( ) function for the mutex.

The mechanisms of this invention apply to semi-active and passive replication, and involve a primary replica and a backup replica. The replica that is checkpointed is the primary replica, and a replica whose state is established from a checkpoint is a backup replica.

The mechanisms of this invention depend on a reliable source-ordered multicast protocol. Reliable means that all of the replicas of an object receive the messages that are multicast to the object. Source ordered means that all of the replicas of an object receive the messages from a given source in the same order. However, if the replicas are multithreaded, and if the threads of the replicas access the shared data in different orders, reliable source-ordered messages alone do not suffice to maintain consistency of the states of the replicas. The primary replica dictates the order in which the threads at the backup replicas claim mutexes. The primary replica piggybacks mutex ordering information on the messages that it multicasts. The threads of the replicas of an object claim and release mutexes in the same order.

The current invention extends the teachings of that invention by describing mechanisms for recording and restoring checkpoints of the threads of objects of multithreaded application programs so that, for passive replication, a backup replica obtains checkpoints for the threads and, for semi-active replication, a new or recovering backup replica obtains checkpoints for the threads, relative to the order in which the threads claim and release mutexes, in order to achieve consistency of the state of the backup replica with that of the primary replica that was checkpointed.

Kinds of State

The mechanisms of the current invention provide checkpoints for threads and shared data for two kinds of data (state), private thread state and shared data:

Private thread state is accessed by only the particular thread and is checkpointed as a part of the checkpointing of the thread. The mechanisms of the invention are used to record and subsequently restore private thread state.

Shared data can be accessed by multiple threads. The mechanisms of the invention are used to record and subsequently restore shared data by exploiting the mutexes that control access to the shared data.

Kinds of Threads

The mechanisms of the current invention support three kinds of threads, stateless threads, invoked-checkpoint threads and self-checkpointing threads.

A stateless thread is a thread that has no private state (including no private state implicit in the program counter). An example of a stateless thread is a thread, within a thread pool, that can be activated to process a message but that is not processing a message currently. Stateless threads can access shared state by claiming mutexes. Because a stateless thread contains no state, a stateless thread is never checkpointed. The mechanisms of the invention assist in checkpointing programs that contain stateless threads.

An invoked-checkpoint thread is a thread for which a get_thread_state( ) method of the thread is invoked by the checkpoint infrastructure and executed by the thread. The invocation is queued until the thread has become quiescent, i.e., has completed its prior method invocation and is ready to accept a new method invocation. Quiescence simplifies the taking of a checkpoint because it is not necessary to record or recreate the current position of the thread in its sequential flow of control.

A self-checkpointing thread is a thread that periodically reads an object checkpoint number (although preferably implemented as a numerical value other value forms may be utilized for identifying a sequence of checkpoints), to determine whether the checkpoint infrastructure has initiated a new checkpoint of the object and, thus, whether it needs to checkpoint its state. Examples of self-checkpointing threads are "perpetual" threads that never become quiescent or that take a long time to complete. Self-checkpointing threads are more difficult to program, because the program must contain checks on the need to take a checkpoint so that the checkpoints are taken sufficiently frequently.

Even more difficult, for a self-checkpointing thread, is recording, and subsequently recreating, the current position of the thread in its flow of control. If the thread is within a nested method invocation, the checkpoint must record that method invocation and its parameters, as well as values of the local variables of that method invocation. When restarting from a checkpoint, the thread must enter the nested method invocation, and set the values of the parameters and of the local variables from the checkpoint.

Checkpointing and restoring the threads' local states are straightforward, but checkpointing and restoring shared data are more involved. In the mechanisms of this invention, the shared data are checkpointed by the wrapper of the claim( ) function that controls access to the shared data.

Information Required for Checkpointing

The information required for checkpointing consists of:

Invoked-checkpoint thread references that the checkpoint infrastructure uses to invoke the get_thread_state( ) and set_thread_state( ) methods of the invoked-checkpoint threads.

Self-checkpointing thread references that the checkpoint infrastructure uses to invoke the restore_thread_state( ) method of the self-checkpointing threads. The corresponding record_thread_state( ) method is a method of the checkpoint infrastructure that the self-checkpointing threads invoke.

Mutexes together with references to invoke the claim( ) and release( ) functions of the mutexes that protect the shared data.

Shared data references that the mutexes use to invoke the get_shared_data( ) and set_shared_data( ) methods of the shared data.

objectCheckpointNumber for each object that corresponds to the most recent checkpoint that the checkpoint infrastructure initiated for that object.

threadCheckpointNumber for each thread that corresponds to the most recent checkpoint that the thread recorded.

mutexCheckpointNumber for each mutex that corresponds to the most recent checkpoint that the mutex recorded for the shared data that it protects.

Asynchronous Checkpointing of Threads

The invention disclosed here allows different threads within an object, process or other component of a multi-threaded application program, that is replicated using semi-active or passive replication, to be checkpointed at different times in such a way that the checkpoints restore a consistent state of the threads, even though the threads execute concurrently and asynchronously.

To initiate a new checkpoint, the checkpoint infrastructure first increments the objectCheckpointNumber. It then invokes the get_thread_state( ) method for each invoked-checkpoint thread. Concurrently, each self-checkpointing thread notes that the objectCheckpointNumber has increased and invokes the record_thread_state( ) method, supplying its checkpoint as a parameter.

An invoked-checkpoint thread might be processing another invocation and might not be able to process the get_thread_state( ) method immediately. Moreover, a self-checkpointing thread might not note the incremented objectCheckpointNumber immediately, or might not be in a state in which it can record its checkpoint. In addition, shared data might be currently locked by a thread and, thus, might be unavailable for checkpointing until the thread releases the mutex. It is possible, indeed likely, that no moment of time ever exists at which all of the threads of an object are simultaneously quiescent or, otherwise, available for checkpointing. Consequently, the mechanisms of the invention checkpoint the threads of an object incrementally while those threads are executing. Moreover, the mechanisms of the invention checkpoint different threads, and also different shared data, at different times, with values that did not exist at the same time, and possibly could not exist at the same time.

The objects of the application program are replicated for fault tolerance based on the semi-active or passive replication strategy, in which there is a primary replica and one or more backup replicas. The primary replica acts as the leader, which makes decisions about the order in which messages are processed, mutexes are granted and so forth, and communicates those decisions to the backup replicas, which follow the decisions of the leader. The primary replica is the replica that is checkpointed, and the backup replica is the replica that establishes its state from a checkpoint. If there is only a primary replica and no backup replica, and if the primary replica fails, then service is necessarily suspended until the faulty primary replica is repaired and restarted from a checkpoint.

Although some of the diagrams below show only a single client, typically more than one client will exist. Moreover, the server replicas might also act as clients by invoking methods of other servers. The mechanisms of the current invention are unaffected by those extensions.

An application object consists of at least one thread, and typically a plurality of threads, and may contain several mutexes that protect different shared data. The present invention, and the mechanisms described below, are unaffected by the number of threads or by the number of sets of shared data.

It should be appreciated that other mechanisms besides mutexes have been devised for providing exclusive access to shared data, including semaphores, monitors and rendezvous mechanisms. These mechanisms operate under similar principles as mutexes to protect the shared data. It will be appreciated that the mechanisms of the current invention are readily extended to other kinds of mutual exclusion mechanisms.

In the preferred embodiment of this invention, for each object, the checkpoint infrastructure maintains a global variable, objectCheckpointNumber, which contains the checkpoint number of the most recent checkpoint that the checkpoint infrastructure has initiated for an object. Each self-checkpointing thread maintains a local variable, threadCheckpointNumber, which contains the checkpoint number of the most recent checkpoint that the thread has recorded. Each mutex that protects shared data has a mutexCheckpointNumber.

Messages that are received after a checkpoint is taken are stored in a message log, so that they can be replayed to the backup replica after its state is initialized from the checkpoint. The message log resides preferably in the main memory of the remote computer on which the backup replica will be restored, although it may be stored in the main memory of the local computer or on a local or remote disk.

Checkpointing and Restoring Invoked-Checkpoint Threads

Each invoked-checkpoint thread provides get_thread_state( ) and set_thread_state( ) methods.

To take a checkpoint, the checkpoint infrastructure generates a request message that contains an invocation of the get_thread_state( ) method of the invoked-checkpoint thread. A message containing the get_thread_state( ) method and its reply is ordered, recorded in the message log and delivered with other messages that contain method invocations. The reply to the get_thread_state( ) invocation contains the checkpoint data, and is logged with the other messages.

The manner in which the get_thread_state( ) method generates the checkpoint for the reply is application-dependent. It is possible to build a source-code preprocessor tool that pre-processes the source code of the application program and generates source code for the get_thread_state( ) and set_thread_state( ) methods.

To restart an invoked-checkpoint thread from a checkpoint with a specific objectCheckpointNumber, first the checkpoint infrastructure locates, in the message log, the request and reply messages for the get_thread_state( ) invocation, for that particular objectCheckpointNumber. It removes from the message log each reply message for the get_thread_state( ) invocation and converts it into a request message that contains the set_thread_state( ) invocation. It replaces in the message log the reply message for the get_thread_state( ) invocation with the request message that contains the set_thread_state( ) invocation. The infrastructure then replays the message log to the new replica, commencing with the first message that contains the set_thread_state( ) invocation.

The parameter of the set_thread_state( ) method is the checkpoint returned when the checkpoint infrastructure invoked the get_thread_state( ) method. The set_thread_state( ) method assigns the value of the checkpoint to the attributes or variables of the thread.

Checkpointing and Restoring Self-Checkpointing Threads

Each self-checkpointing thread maintains a checkpoint data structure and a restoringCheckpoint flag, invokes a restore_thread_state( ) method of the checkpoint infrastructure, and provides a restore_thread_state( ) method that the checkpoint infrastructure invokes.

Each self-checkpointing thread periodically checks the objectCheckpointNumber. If its threadCheckpointNumber is less than the objectCheckpointNumber, the thread invokes the record_thread_state( ) method of the checkpoint infrastructure to record its checkpoint. The checkpoint contains the current position of the thread in its flow of control, including the names of nested method invocations and their parameters and local variables.

To restart a self-checkpointing thread, the checkpoint infrastructure invokes the restore_thread_state( ) method of the thread. The restore_thread_state( ) method sets the local thread data to the values that the record_thread_state( ) method recorded for the checkpoint. The restore_thread_state( ) method sets the restoringCheckpoint flag and creates a checkpoint structure that is used to restore the values of other data. The infrastructure then invokes the last method that the self-checkpointing thread invoked prior to the recording of the checkpoint by the record_thread_state( ) method.

Program code, inserted into the code of the self-checkpointing thread, checks the value of the restoringCcheckpoint flag and uses the checkpoint structure to restore the current position of the flow of control, including the names of nested method invocations and their parameters and local variables, and to start the thread executing. The self-checkpointing thread might need to access shared data and, thus, claim mutexes. Handling those claims and setting the shared data values are the same as described above for invoked-checkpoint threads.

Checkpointing and Restoring Shared Data

Shared data are checkpointed, and restored, by the CMT claim( ) wrapper function of the mutex that protects the shared data, which is invoked by the threads that need to access the shared data.

If the mutexCheckpointNumber, held by the mutex for the shared data, is less than the threadCheckpointNumber, held by the thread for the last checkpoint that it recorded, then the most recent checkpoint of the shared data is not current and the CMT claim( ) function of the mutex invokes the get_shared_data( ) method to checkpoint the shared data. The infrastructure records the checkpoint for the shared data as part of the OrderedClaims piggybacked on messages in the message log, along with the information about the order in which the mutex is granted to the threads, to ensure that the checkpoints are replayed in the same order as they were taken.

In addition, the checkpoint infrastructure checkpoints shared data that are not accessed by any of the threads in a timely manner. It regards such checkpointing as a low priority activity. The checkpoint infrastructure sequentially claims and immediately releases the mutexes that access the shared data, thus ensuring that all of the shared data are checkpointed.

During the restart of a replica, which involves the replay of the messages in the message log, the threads need to access the shared data and claim the mutexes that protect the shared data. The OrderedClaims piggybacked on the messages in the message log grant the mutexes to the threads at the backup replicas in the same order as the mutexes were granted to the threads at the primary replica. The checkpoints for the shared data in the OrderedClaims are used to assign values to the shared data when the mutexes are granted at a backup replica that is establishing its state from a checkpoint. For an OrderedClaim that does not contain a checkpoint, the current values of the shared data continue to be used after the mutex is granted.

If an OrderedClaim for a mutex contains a checkpoint number that is less than the current mutexCheckpointNumber of the mutex, the CMT claim( ) function ignores the OrderedClaim. If an OrderedClaim for a mutex contains a checkpoint number that is equal to the current mutexCheckpointNumber of the mutex, the CMT claim( ) function grants the mutex but does not invoke the set_shared_data( ) method to reset the shared data to the value of the checkpoint, but simply grants the mutex. If an OrderedClaim for a mutex contains a checkpoint and a checkpoint number that is greater than the current mutexCheckpointNumber of the mutex, the CMT claim( ) function invokes the set_shared_data( ) method to reset the shared data to the value of the checkpoint and then grants the mutex.

Communication for Checkpointing and Restoring a Replicated Server

FIG. 1 shows a client 2 invoking a server, where the server is replicated as a primary server replica 4 and a backup server replica 6. The primary server contains two threads A 8 and B 10, and the backup server contains two threads A 14 and B 16. The primary server also contains shared data 12 that both threads access, and the backup server contains shared data 18 that both threads access.

The client multicasts a request message 30 to the primary server 20 and the backup server 26. The primary server sends a reply message to the client 22. The client multicasts another request message 34 to the primary server 24 and the backup server 28.

FIG. 1 shows that, when the primary server transmits the reply 22 to the client, it piggybacks ordering information and the checkpoint of the shared data 32 onto the reply message. When the client multicasts its next request message 24 to the primary server and the backup server, it piggybacks the ordering information and the checkpoint of the shared data 34 from the reply message onto the request message. If the client does not need to make an immediate further request of the server, the client must acknowledge receipt of the reply message and piggybacks the ordering information and the checkpoint of the shared data from the reply message 16 onto the acknowledgment message.

Note that the ordering information is communicated from the primary server to the backup server, without introducing any additional messages. Note also that the reply message is transmitted from the primary server to the client without introducing any additional delay, before the client receives the reply message, over and above the delay that would be incurred without replication.

Checkpointing and Restoring Thread State

Figure 2:
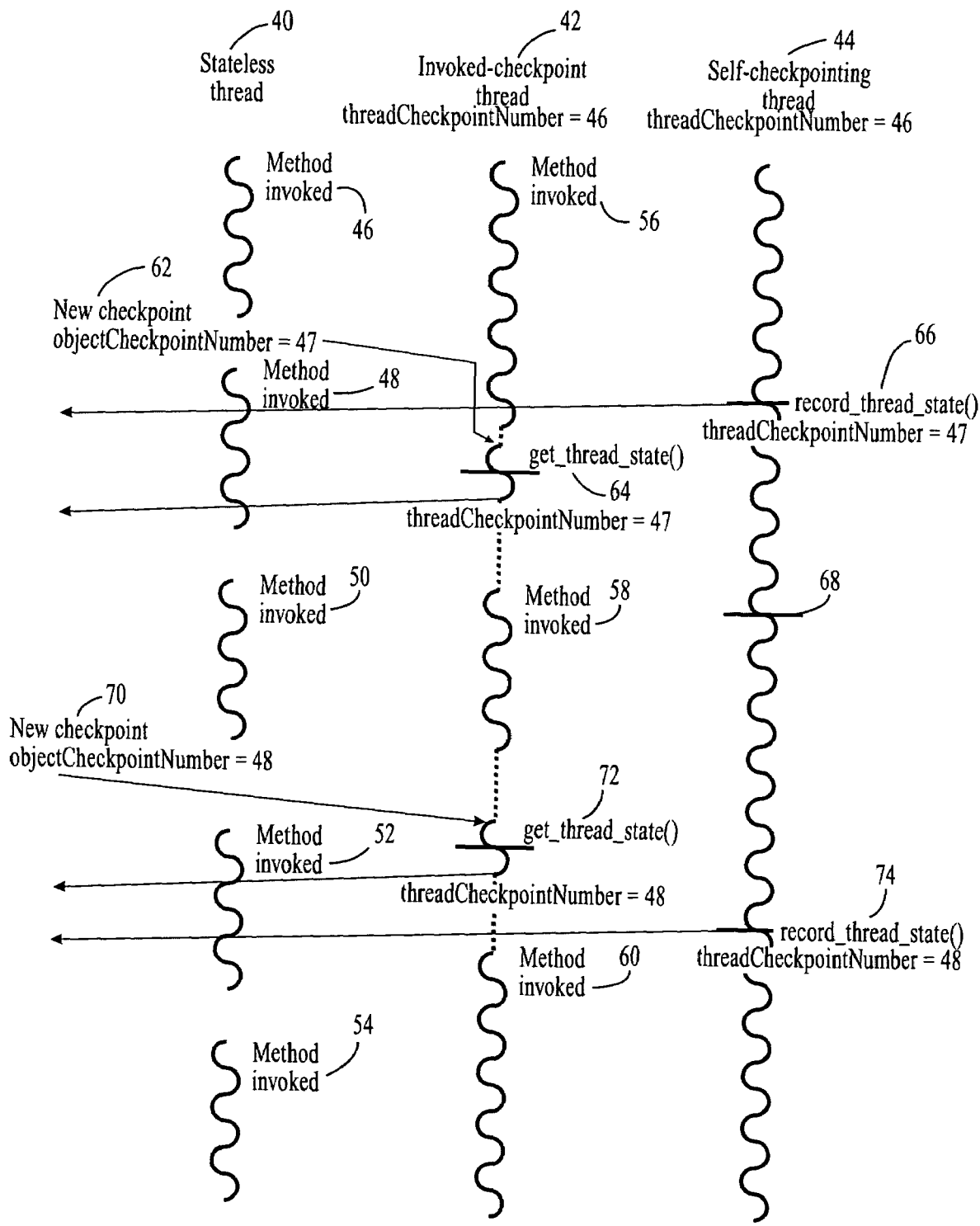
FIG. 2 is a diagram of a stateless thread, an invoked-checkpoint thread and a self-checkpointing thread according to an aspect of the present invention, showing the checkpointing of the invoked-checkpoint thread and the self-checkpointing thread.

FIG. 2 shows a stateless thread 40, an invoked-checkpoint thread 42 and a self-checkpointing thread 44. Periodically, clients invoke methods 46, 48, 50, 52 and 54 that the stateless thread executes. Because a stateless thread contains no state, a stateless thread is never checkpointed. Likewise, periodically, clients invoke methods 56, 58 and 60 that the invoked-checkpoint thread executes. Between method invocations, the state is maintained within the invoked-checkpoint thread. The self-checkpointing thread operates continuously.

When a new checkpoint 62 is started with objectCheckpointNumber=47, the checkpoint infrastructure tries to invoke the get_thread_state( ) method 64 of the invoked-checkpoint thread; however, that thread is processing another method invocation. Consequently, the checkpoint infrastructure queues the get_thread_state( ) method invocation until the invoked-checkpoint thread completes the prior invocation. When the invoked-checkpoint thread completes the prior invocation, the checkpoint infrastructure invokes the get_thread_state( ) method 64 of the invoked-checkpoint thread, which returns the state of the thread. The infrastructure records the message containing the checkpoint in the message log, along with messages that contain other method invocations, so that the checkpoint is recorded at a specific position in the message sequence.

Meanwhile, the self-checkpointing thread checks the value of the objectCheckpointNumber, and determines that the checkpoint infrastructure has started a new checkpoint since the last checkpoint that it recorded. Consequently, the self-checkpointing thread invokes the record_thread_state( ) method 66 to record its state. When the self-checkpointing thread next checks 68 the value of the objectCheckpointNumber, it notes that the value of the objectCheckpointNumber is unchanged, indicating that the checkpoint infrastructure has not started another checkpoint in the meantime. Thus, the self-checkpointing thread does not invoke the record_thread_state( ) method.

When it starts the next new checkpoint 70 with objectCheckpointNumber=48, the checkpoint infrastructure invokes the get_thread_state( ) method 72 of the invoked-checkpoint thread. Because the invoked-checkpoint thread is quiescent, it executes the method immediately and returns the state of the thread in the reply.

However, when the checkpoint infrastructure starts the new checkpoint, the self-checkpointing thread is processing. The self-checkpointing thread does not check the value of the objectCheckpointNumber until a later time. At that time, it determines that the objectCheckpointNumber has increased since the last checkpoint that it recorded and, thus, that the checkpoint infrastructure has started a new checkpoint. Consequently, the self-checkpointing thread invokes the record_thread_state( ) method 74 to record its state.

Restarting from a Checkpoint

Figure 3:
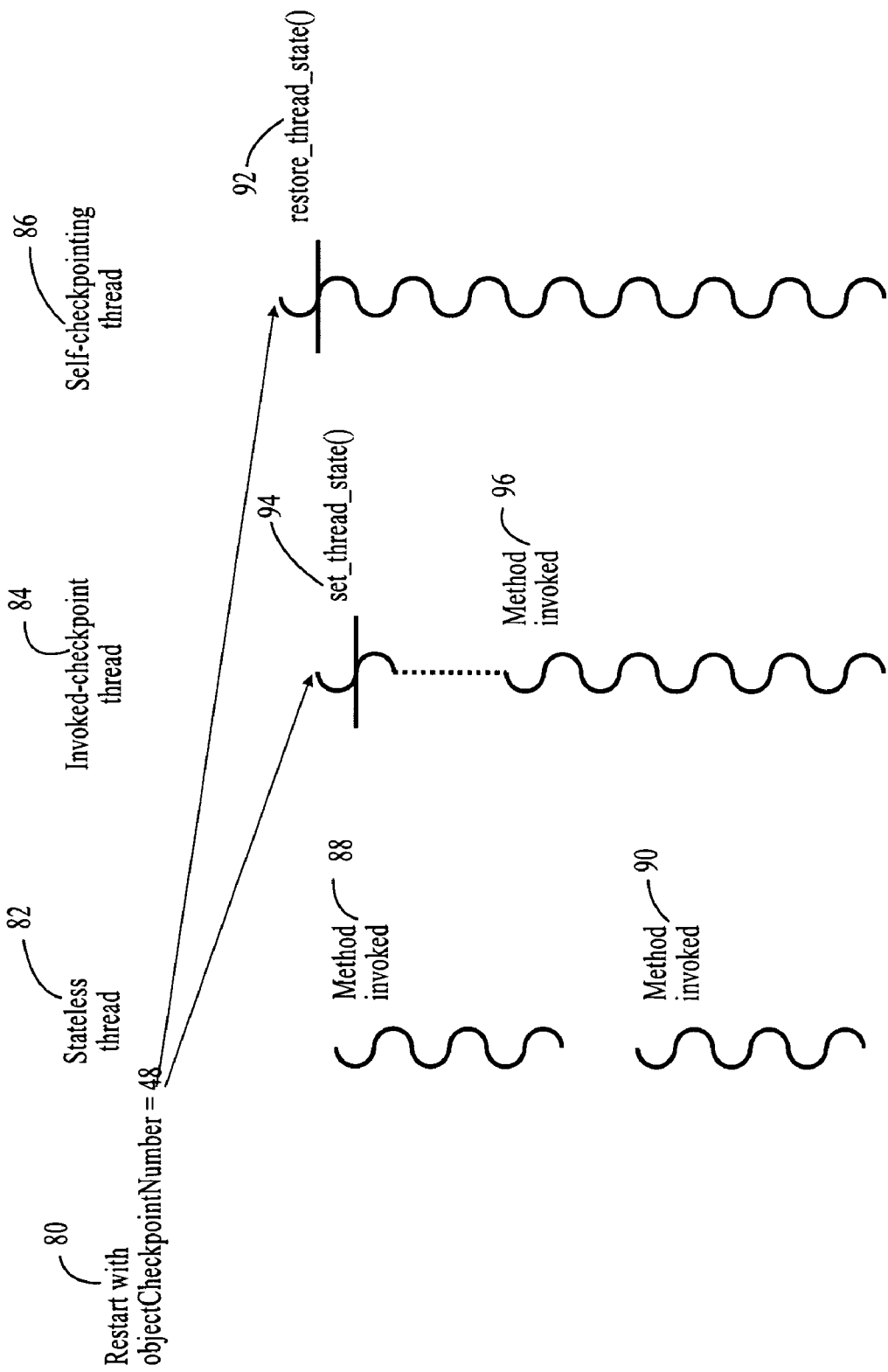
FIG. 3 is a diagram of a stateless thread, an invoked-checkpoint thread and a self-checkpointing thread according to an aspect of the present invention, showing the restoration of the state of the invoked-checkpoint thread and the self-checkpointing thread on recovering or starting a backup replica from a checkpoint.

FIG. 3 shows a restart 80 from a checkpoint with objectCheckpointNumber=48. The stateless thread 82, the invoked-checkpoint thread 84 and the self-checkpointing thread 86 are created. The stateless thread requires no state restoration. Consequently, a stateless thread can process clients' method invocations 88, 90 as soon as it receives them. The checkpoint infrastructure invokes the restore_thread_state( ) method 92 of the self-checkpointing thread, supplying it the state that it recorded for the checkpoint by the restore_thread_state( ) method (74 of FIG. 2). The self-checkpointing thread resumes processing immediately from the state set by the restore_thread_state( ) method. The checkpoint infrastructure also invokes the set_thread_state( ) method 94 of the invoked-checkpoint thread, supplying it the state that it recorded for the checkpoint (74 of FIG. 2). The invoked-checkpoint thread then awaits the next method invocation 96 from the client or from replaying the messages in the message log, until the log becomes empty.

Checkpointing Shared Data Accessed by a Single Thread

Figure 4:
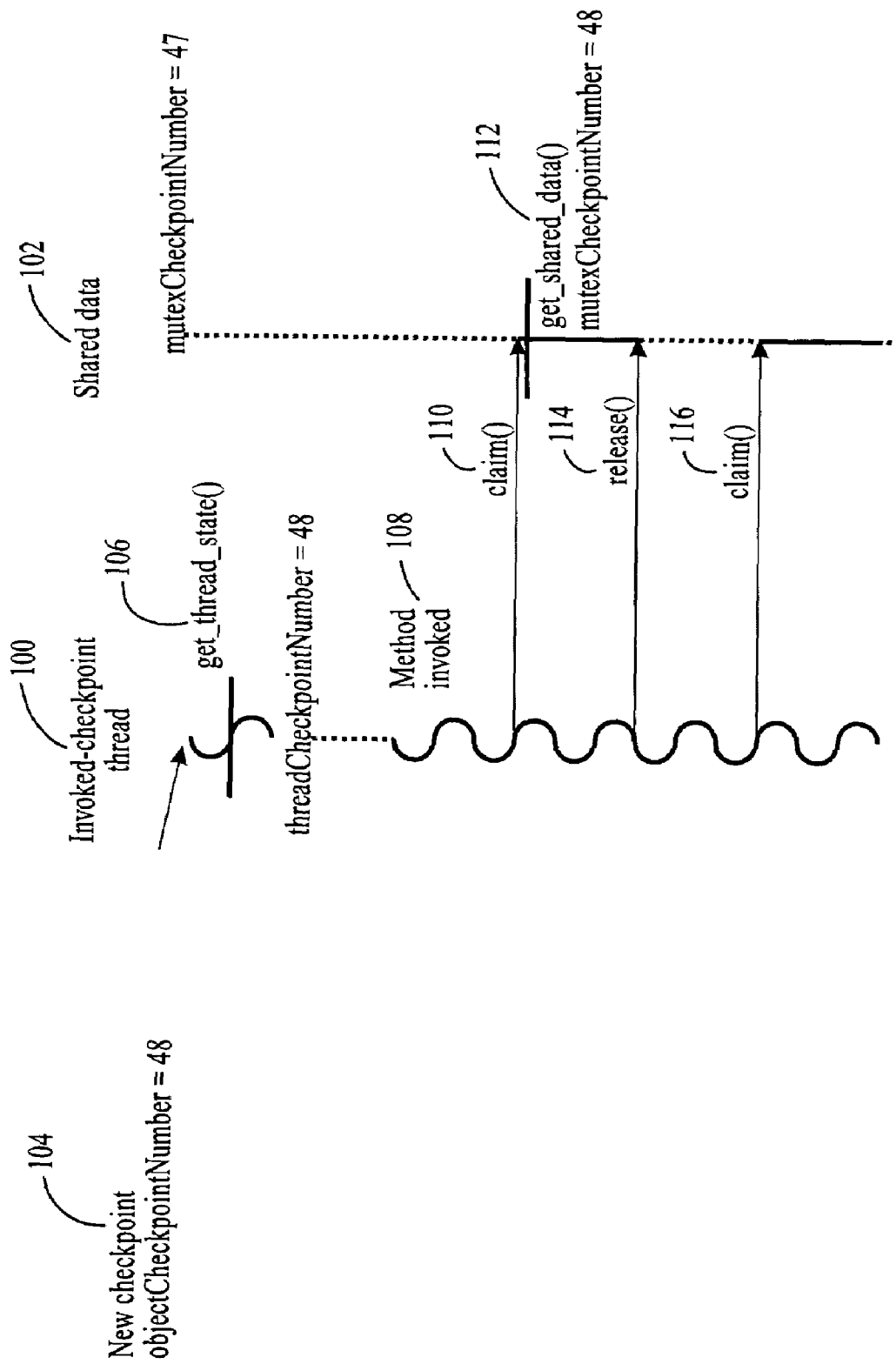
FIG. 4 is a diagram of checkpointing of shared data accessed by a single thread in a primary replica according to an aspect of the present invention.

In FIG. 4 an invoked-checkpoint thread 100 of an existing replica accesses shared data 102. The checkpoint infrastructure starts a new checkpoint 104 with objectCheckpointNumber=48, and invokes the get_thread_state( ) method 106 of the invoked-checkpoint thread to obtain the state of that thread for the checkpoint. A client invokes a method 108 that the invoked-checkpoint thread processes. Subsequently, the thread needs to access shared data and, thus, claims 110 the mutex for that shared data. The CMT claim( ) wrapper function determines that the mutexCheckpointNumber=47, held by the mutex for the shared data, is less than the threadCheckpointNumber=48, held by the thread for the checkpoint that it last recorded. Consequently, the CMT claim( ) function invokes the get_shared_data( ) method 112 to checkpoint the shared data. The infrastructure records the checkpoint of the shared data in OrderedClaims in a message in the message log to ensure that the checkpoints are replayed in the same order as they were taken. When the thread finishes accessing the shared data, it invokes the CMT release( ) function 114 of the mutex. Subsequently, the thread needs to access the shared data and, thus, invokes the CMT claim( ) function 116 of the mutex. The CMT claim( ) function determines that the threadCheckpointNumber=48, held by the thread, is equal to the mutexCheckpointNumber=48, held by the mutex for the shared data. Consequently, there is no need to checkpoint the shared data.

Restoring Shared Data Accessed by a Single Thread

Figure 5:
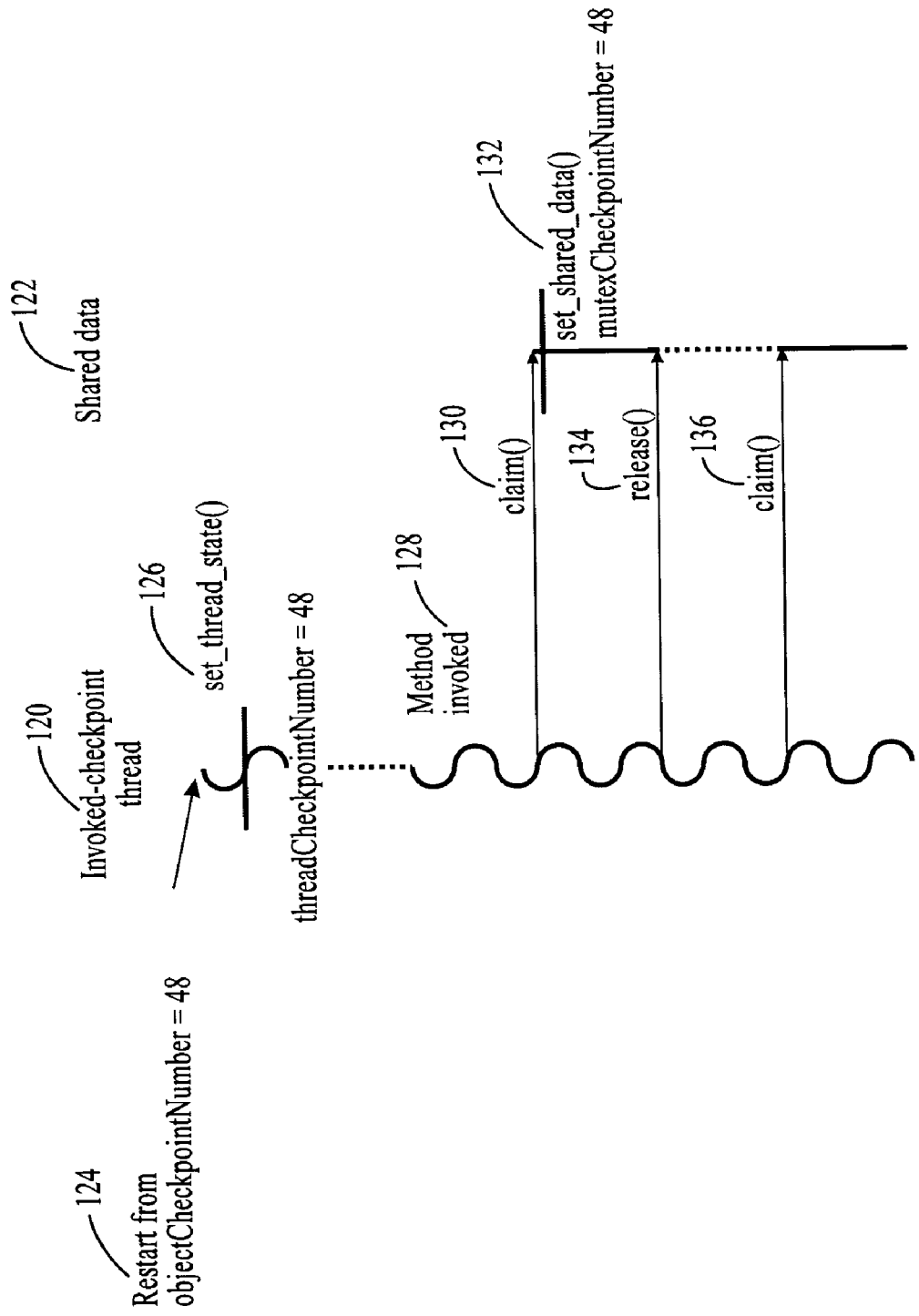
FIG. 5 is a diagram of restoration of shared data accessed by a single thread in a backup replica according to an aspect of the present invention.

In FIG. 5 an invoked-checkpoint thread 120 of a new replica that accesses shared data 122 is started from the checkpoint that was previously recorded (112 in FIG. 4). When the checkpoint infrastructure restarts 124 from the checkpoint with objectCheckpointNumber=48, it invokes the set_thread_state( ) method 126 of the invoked-checkpoint thread. The set_thread_state( ) method restores the values of the local variables of the invoked-checkpoint thread, but does not restore the values of the variables of the shared data. Subsequently, during the replay of the messages in the message log, a client invokes a method 128 that is processed by the thread.

When the thread of the new replica needs to access the shared data, it invokes the CMT claim( ) function 130 of the mutex that protects the shared data. The claim is granted according to an OrderedClaim piggybacked on a message in the message log to ensure that the mutex is granted to the threads in the same order as it was granted during the original processing. In this case, the CMT claim( ) function recorded a checkpoint during the original processing (112 in FIG. 4). During restoration of the new replica, the checkpoint infrastructure finds the checkpoint in an OrderedClaim piggybacked on a message in the message log and passes the checkpoint to the CMT claim( ) function, which invokes the set_shared_data( ) method 132 that sets the values of the shared data using the checkpoint. The thread finishes accessing the shared data and then invokes the CMT release( ) function 134 of the mutex. Subsequently, the thread needs to access the shared data and invokes the CMT claim( ) function 136 of the mutex. The OrderedClaim piggybacked on a message in the message log that allocates the mutex to the thread contains no checkpoint data. Consequently, the thread uses the existing values of the shared data.

Checkpointing Shared Data Accessed by Multiple Threads

Figure 6:
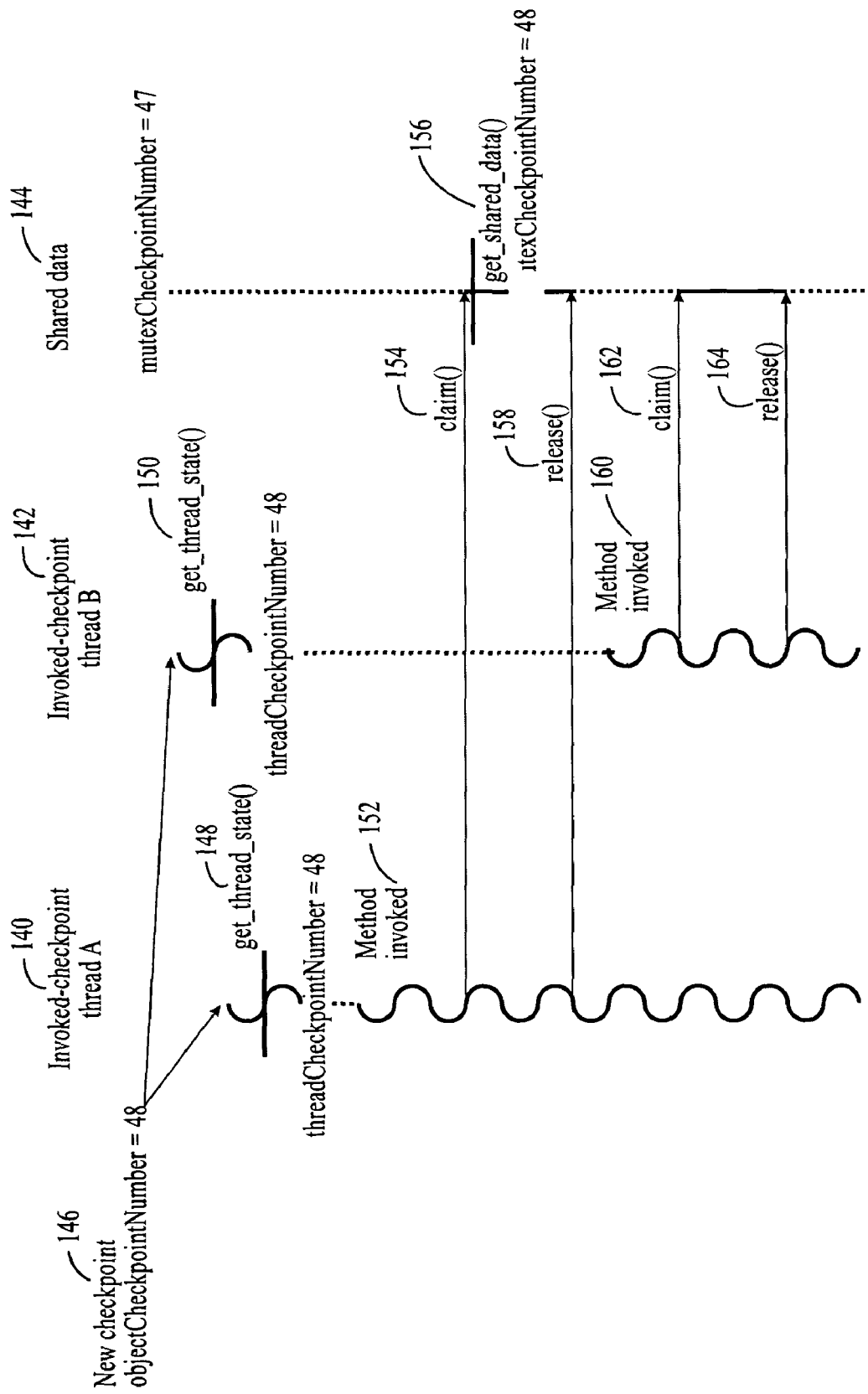
FIG. 6 is a diagram of checkpointing shared data accessed by multiple threads in a primary replica according to an aspect of the present invention.

In FIG. 6 two invoked-checkpoint threads, thread A 140 and thread B 142, share data 144. When a new checkpoint 146 with objectCheckpointNumber=48 is started, the checkpoint infrastructure invokes the get_thread_state( ) methods 148, 150 of both threads to obtain their states for the checkpoint. Both threads record the same threadCheckpointNumber=48, although not necessarily at exactly the same time. A client then invokes a method 152 that is processed by thread A. Because thread A needs to access the shared data, it invokes the CMT claim( ) function 154 of the mutex. The CMT claim( ) function determines that the mutexCheckpointNumber=47, held by the mutex for the shared data, is less than the threadCheckpointNumber=48, held by thread A for the last checkpoint that it recorded. Consequently, the CMT claim( ) function invokes the get_shared_data( ) method 156 to checkpoint the shared data. Subsequently, thread A finishes accessing the shared data and then invokes the CMT release( ) function 158 of the mutex.

Later, a client invokes a method 160 that is processed by thread B, and thread B needs to access the shared data and invokes the CMT claim( ) function 162 of the mutex and, subsequently, the release( ) function 164 of the mutex. The CMT claim( ) function determines that the threadCheckpointNumber=48, held by thread B, is equal to the mutexCheckpointNumber=48, held by the mutex for the shared data. Consequently, there is no need to checkpoint the shared data.

Restoring Shared Data Accessed by Multipi Threads

Figure 7:
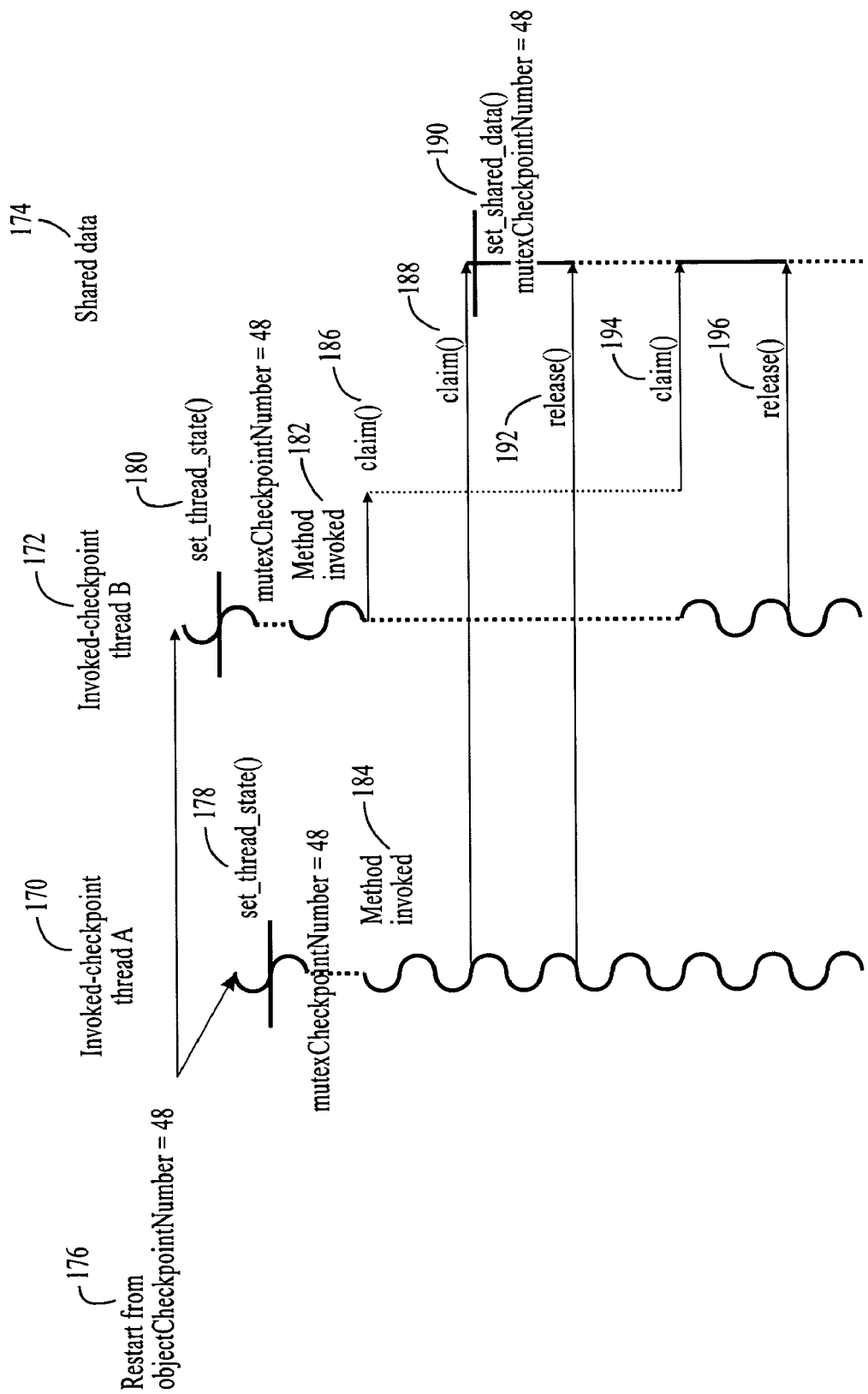
FIG. 7 is a diagram of the restoration of shared data accessed by multiple threads in a backup replica according to an aspect of the present invention.

FIG. 7 shows a restart from the checkpoint recorded in FIG. 6, again for thread A 170, thread B 172 and the shared data 174. When the checkpoint infrastructure restarts 176 the object from objectCheckpointNumber=48, it invokes the set_thread_state( ) method 178 of thread A and the set_thread_state( ) method 180 of thread B. The infrastructure then replays the messages from the message log. It cannot be guaranteed that the replay of messages from the log results in processing in the same relative timing of the threads as the original processing; however, the checkpoint infrastructure allows such differences in timing while maintaining strong replica consistency.

In FIG. 7 a client invokes a method 182 that is processed by thread B, and thread B starts processing earlier than is shown at 160 in FIG. 6, using its local state, which was set by the set_thread_state( ) method 180. Soon after, thread B needs to access the shared data and invokes the CMT claim( ) function 186 of the mutex before thread A does so. If thread B were allowed to access the shared data at this time, it would obtain incorrect data. In the original execution shown in FIG. 6, thread B used values of the shared data after thread A had manipulated that shared data. However, the CMT claim( ) function uses information on the ordering of claims, recorded in the message log, to determine that thread A must claim the mutex before thread B does so. Consequently, it suspends thread B until thread A has accessed the shared data.

Subsequently, a client invokes a method 184 that is processed by thread A. When thread A needs to access the shared data, it invokes the CMT claim( ) function 188 of the mutex for the shared data. The claim of thread A is granted before the claim of thread B, as directed by OrderedClaims piggybacked on the messages in the message log. The OrderedClaim for thread A contains the checkpoint that the CMT claim( ) function recorded during the original processing (156 in FIG. 6). The CMT claim( ) function invokes the set_shared_data( ) method 190, which sets the values of the shared data using the checkpoint and grants the mutex to thread A. Thus, the shared data that thread A accesses has the same values that it had during the original processing. Subsequently, thread A finishes accessing the shared data and, then, invokes the CMT release( ) function 192 of the mutex.

The release of the mutex by thread A allows the suspended thread B to resume in the CMT claim( ) function 194 of the mutex. The CMT mechanisms now allocate the mutex to thread B. Thus, thread B accesses the correct values of the shared data, values that were restored from the checkpoint and then manipulated by thread A. Subsequently, thread B finishes accessing the shared data and, then, invokes the CMT release( ) function 196 of the mutex.

Figure 8:
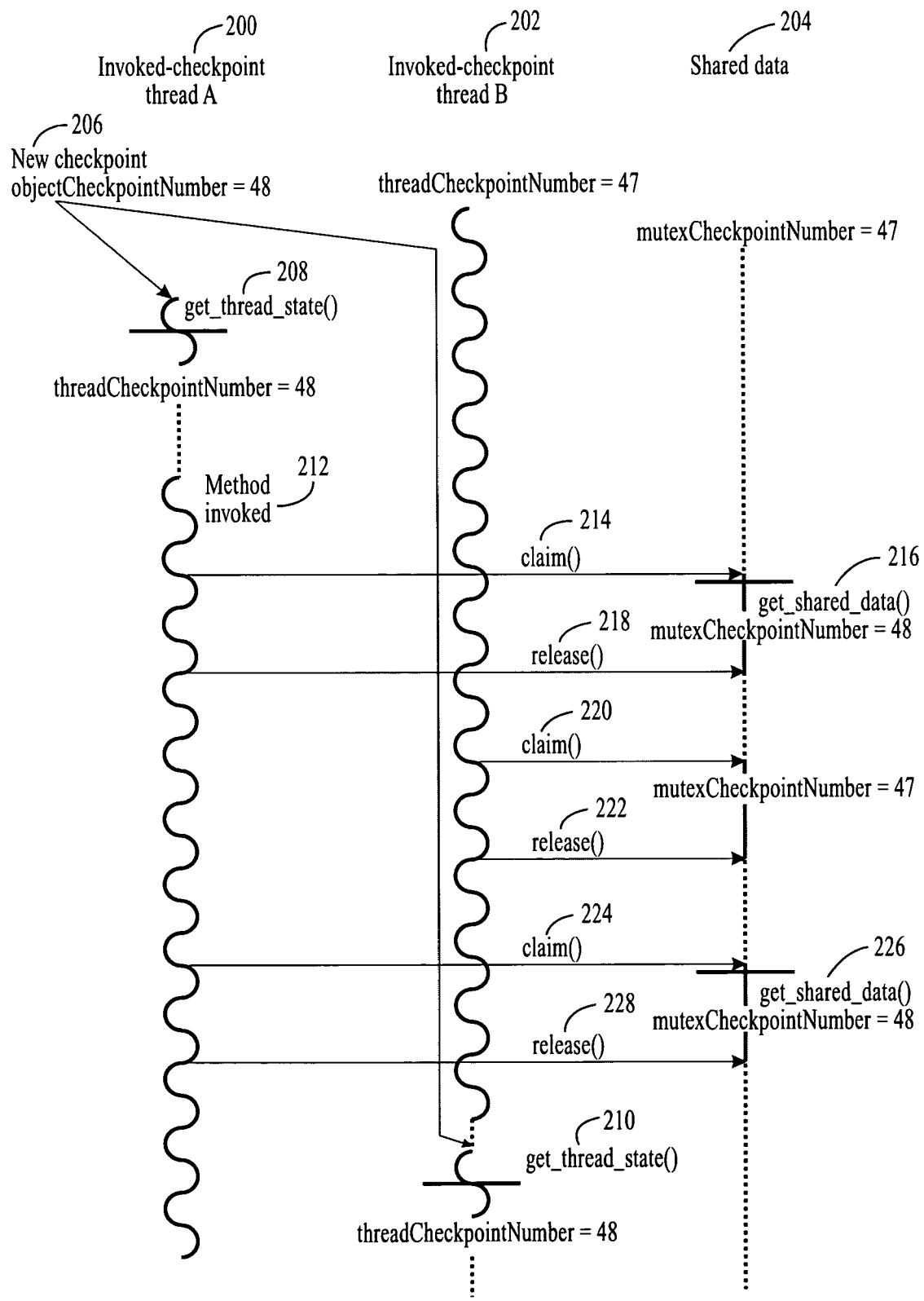
FIG. 8 is a diagram of the checkpointing of shared data accessed by a thread according to an aspect of the present invention, shown with a threadCheckpointNumber that is less than the mutexCheckpointNumber of the mutex that protects the shared data, in a primary replica.

Checkpointing Shared Data Accessed by a Thread with
threadCheckpointNumber<mutexCheckpointNumber FIG. 8 shows two invoked-checkpoint threads, thread A 200 and thread B 202, that share data 204. When the checkpoint infrastructure starts to take a new checkpoint 206 with objectCheckpointNumber=48, it invokes the get_thread_state( ) methods 208, 210 of both threads to obtain their states for the checkpoint. Thread A processes the invocation of get_thread_state( ) immediately, and records threadCheckpointNumber=48. However, thread B is processing a prior method invocation and cannot process the invocation of get_thread_state( ) until later. Instead, thread B continues to process its prior invocation, with threadCheckpointNumber=47, the checkpoint number for which it last recorded a checkpoint.

Next, a client invokes a method 212 that is processed by thread A. Because thread A needs to access the shared data, it invokes the CMT claim( ) function 214 of the mutex. The CMT claim( ) function determines that the mutexCheckpointNumber=47, held by the mutex of the shared data, is less than the threadCheckpointNumber=48, held by thread A for the last checkpoint that it recorded. Consequently, the CMT claim( ) function invokes the get_shared_data( ) method 216 to checkpoint the state of the shared data. Subsequently, thread A finishes accessing the shared data and then invokes the CMT release( ) function 218 of the mutex.

Meanwhile, thread B needs to access the shared data and invokes the CMT claim( ) function 220 of the mutex and, subsequently, the CMT release( ) function 222 of the mutex. The CMT claim( ) function determines that the threadCheckpointNumber=47, held by thread B, is less than the mutexCheckpointNumber=48, held by the mutex for the shared data. Consequently, there is no need to checkpoint the shared data. However, the CMT claim( ) function sets the mutexCheckpointNumber for the shared data to the threadCheckpointNumber=47 of thread B.

Shortly after, thread A again needs to access the shared data and invokes the CMT claim( ) function 224 of the mutex, and later the CMT release( ) function 228 of the mutex. The CMT claim( ) function determines that the mutexCheckpointNumber=47, held by the mutex for the shared data, is less than the threadCheckpointNumber=48, held by thread A. Consequently, the CMT claim( ) function invokes the get_shared_data( ) method 226 to checkpoint the state of the shared data and sets the mutexCheckpointNumber to the threadCheckpointNumber=48 of thread A.

Figure 9:
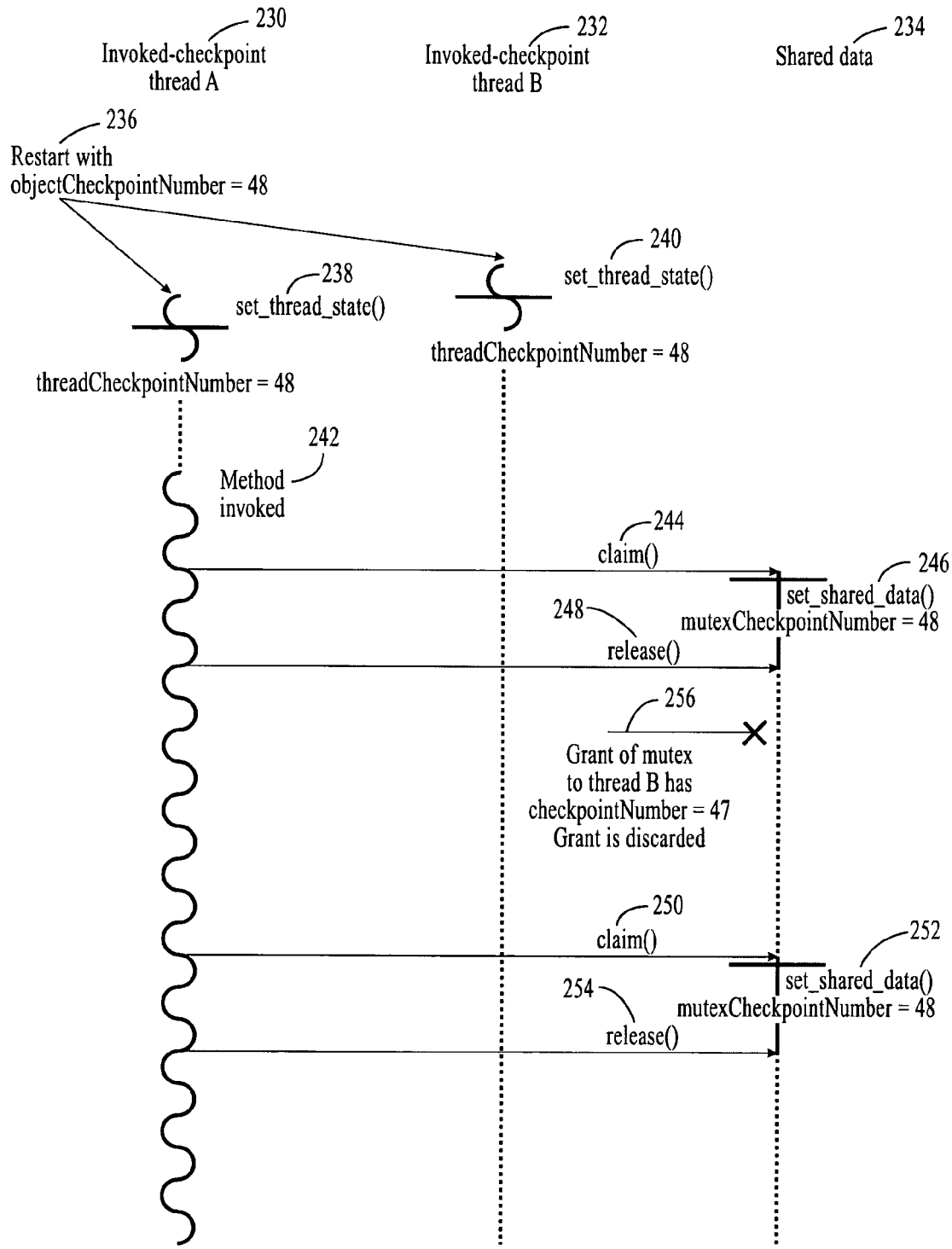
FIG. 9 is a diagram of the restoration of shared data according to an aspect of the present invention, shown accessed by a thread with a threadCheckpointNumber that is less than the mutexCheckpointNumber of the mutex that protects the shared data, in a backup replica.

Restoring Shared Data Accessed by a Thread with threadCheckpointNumber<mutexCheckpointNumber FIG. 9 shows a restart from the checkpoint recorded in FIG. 8, again for thread A 230, thread B 232 and the shared data 234. When the checkpoint infrastructure restarts 236 from the checkpoint with objectCheckpointNumber=48, it invokes the set_thread_state( ) methods 238, 240 of threads A and B. Those invocations restore the states that were recorded by the invocations of the get_thread_state( ) methods of threads A and B (208, 210 in FIG. 8). The infrastructure replays messages from the message log. Because thread B was processing a prior method invocation, with threadCheckpointNumber=47, that processing is not repeated during the restart for threadCheckpointNumber=48. The message log does not contain any invocations for thread B until later; however, it does contain an invocation of thread A.

During the restart and replay of the message log, when that method is invoked 242, thread A invokes the CMT claim( ) function 244 of the mutex for the shared data. Because the CMT claim( ) function recorded a checkpoint during the original processing by invoking the get_shared_data( ) method (216 in FIG. 8), the infrastructure finds the checkpoint in an OrderedClaim in a message in the message log and passes it to the CMT claim( ) function, which invokes the set_shared_data( ) method 246 that sets the values of the shared data using the checkpoint, as described in more detail in FIG. 15. Thus, thread A processes shared data that have the same values as that data had during the original processing. When thread A finishes accessing the shared data, it invokes the CMT release( ) function 248 of the mutex.

Subsequently, thread A again invokes the CMT claim( ) function 250 of the mutex for the shared data. During the original processing, the CMT claim( ) function included a checkpoint along with an OrderedClaim in a message in the message log (226 in FIG. 8). During the replay of messages from the message log, the CMT claim( ) function finds the checkpoint in the OrderedClaim, and invokes the set_shared_data( ) method 252 that sets the values of the shared data using the checkpoint. Thus, thread A processes shared data that have the same values as that data had during the original processing, data that thread B had modified (220 in FIG. 8), even though thread B is not performing that processing during the restart. When thread A finishes accessing the shared data, it invokes the CMT release( ) function 254 of the mutex.

During the replay of the message log, the CMT claim( ) function finds, between the two OrderedClaims described above, a third OrderedClaim that claims the mutex for the shared data for thread B 256, corresponding to the claim 220 in FIG. 8. In that OrderedClaim, the checkpoint number=47, which is less than the current threadCheckpointNumber=48 of thread B; consequently, the CMT claim( ) function determines that the claim of the mutex for thread B is obsolete and discards that OrderedClaim.

Checkpointing and Restoration Algorithms

The checkpointing and restoration algorithms utilize an orderedClaims queue and OrderedClaims piggybacked on regular messages. When a mutex is granted to a thread in the primary replica, the CMT mechanisms insert mutex ordering and checkpoint information for the shared data into the orderedClaims queue. When the infrastructure at the primary replica transmits a regular message or an acknowledgment message, it piggybacks the mutex ordering and checkpoint information in the orderedClaims queue as OrderedClaims onto that message to communicate that information to the backup replicas.

The infrastructure at a backup replica stores that mutex ordering and checkpoint information for shared data in an orderedClaims queue for the mutex that protects that shared data, and uses that mutex ordering and checkpoint information to determine the order in which the mutex is granted to the threads and to restore the value of the shared data from the checkpoint.

The checkpointing and restoration algorithms make reference to a thread T, mutex M, 4-tuple (T, M, N, C) and 5-tuple (T, M, N, C, X). N is obtained from T.N, which represents the Nth attempt of thread T to claim any mutex. C is obtained from T.C, which represents the threadCheckpointNumber of the most recent checkpoint for thread T. X represents the shared data that are being checkpointed.

Primary Replica Thread Invokes the CMT Claim( ) Function to Claim a Mutex

At the primary replica, when thread T invokes the CMT claim( ) function to claim mutex M, the CMT claim( ) function executes the following steps:

```
determine (T, M, T.N, T.C)
invoke the claim( ) function of the OS thread library to claim mutex M
    for thread T
        (which allows the standard mutex scheduling,
        such as transfer of priority, to operate)
when the claim( ) function of the OS thread library grants mutex M
    to thread T
if T.C > M.C
    X = M.get_shared_data( )
    append (T, M, T.N, T.C, X) to the orderedClaims queue
        of claims to be multicast
else
    append (T, M, T.N, T.C,-) to the orderedClaims queue
        of claims to be multicast
M.C = T.C
T.N = T.N+1
```

Figure 10:
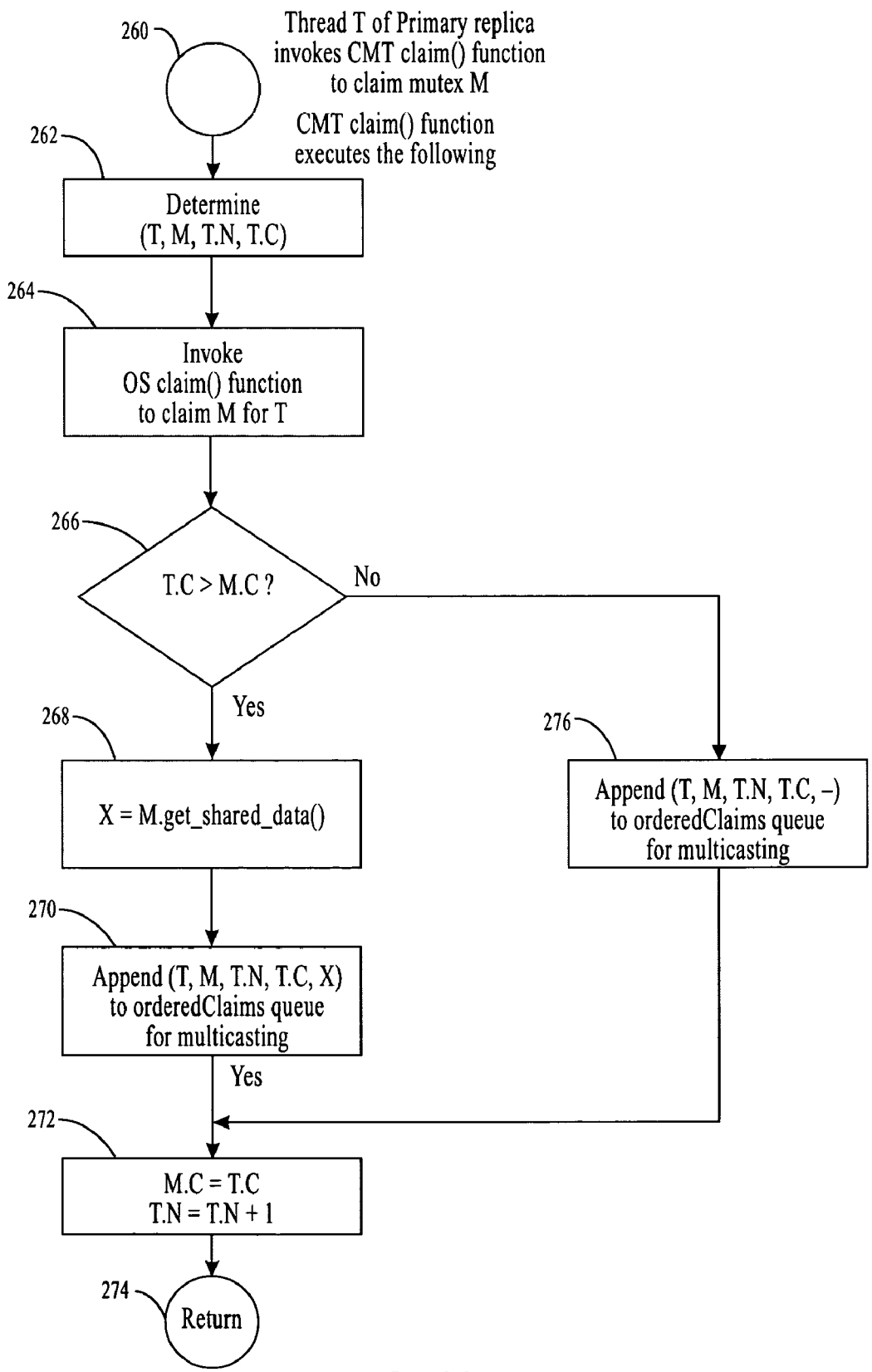
FIG. 10 is a flowchart of a thread of the primary replica invoking the CMT claim( ) wrapper function for a mutex according to an aspect of the present invention, showing the steps taken by that function.

Thus, as shown in FIG. 10, in the primary replica, when thread T invokes the CMT claim( ) function 260 for mutex M, the CMT claim( ) function first determines the 4-tuple (T, M, T.N, T.C) 262.

It then invokes the claim( ) function 264 of the operating system thread library to claim mutex M for thread T, which allows the standard mutex scheduling mechanisms, such as transfer of priority, to operate.

When the operating system thread library claim( ) function grants mutex M to thread T, which could be sometime later, the CMT claim( ) function compares 266 the threadCheckpointNumber T.C for the most recent checkpoint that thread T recorded with the mutexCheckpointNumber M.C for the most recent checkpoint that mutex M recorded.

If T.C is greater than M.C, the CMT claim( ) function invokes the get_shared_data( ) method 268 for mutex M, which returns the state X. The CMT claim( ) function appends 270 the 5-tuple (T, M, T.N, T.C, X) to the orderedClaims queue of claims to be multicast, then sets M.C equal to T.C and increments T.N 272, and returns 274, granting mutex M to thread T and allowing the application to proceed.

If T.C is less than or equal to M.C, the CMT claim( ) function appends 276 the 5-tuple (T, M, T.N, T.C,–) to the orderedClaims queue of claims to be multicast, then sets M.C equal to T.C and increments T.N 272, and returns 274, granting mutex M to thread T and allowing the application to proceed.

Primary Replica Multicasts a Message with Piggybacked Ordered Claims

Periodically, when the infrastructure at the primary replica transmits a regular message or an acknowledgment message, or adds an entry to the orderedClaims queue and determines that the orderedClaims queue is too long and that an acknowledgment message must be transmitted, the infrastructure piggybacks the entries of the orderedClaims queue and the checkpoints for the shared data onto the message and multicasts it, as shown at 32 and 34 in FIG. 1.

Primary Replica Thread Invokes CMT Release( ) Function to Release a Mutex

When thread T of the primary replica invokes the CMT release( ) function to release mutex M, the CMT release( ) function executes the following step:

invoke the release( ) function of OS thread library to release mutex M

Figure 11:
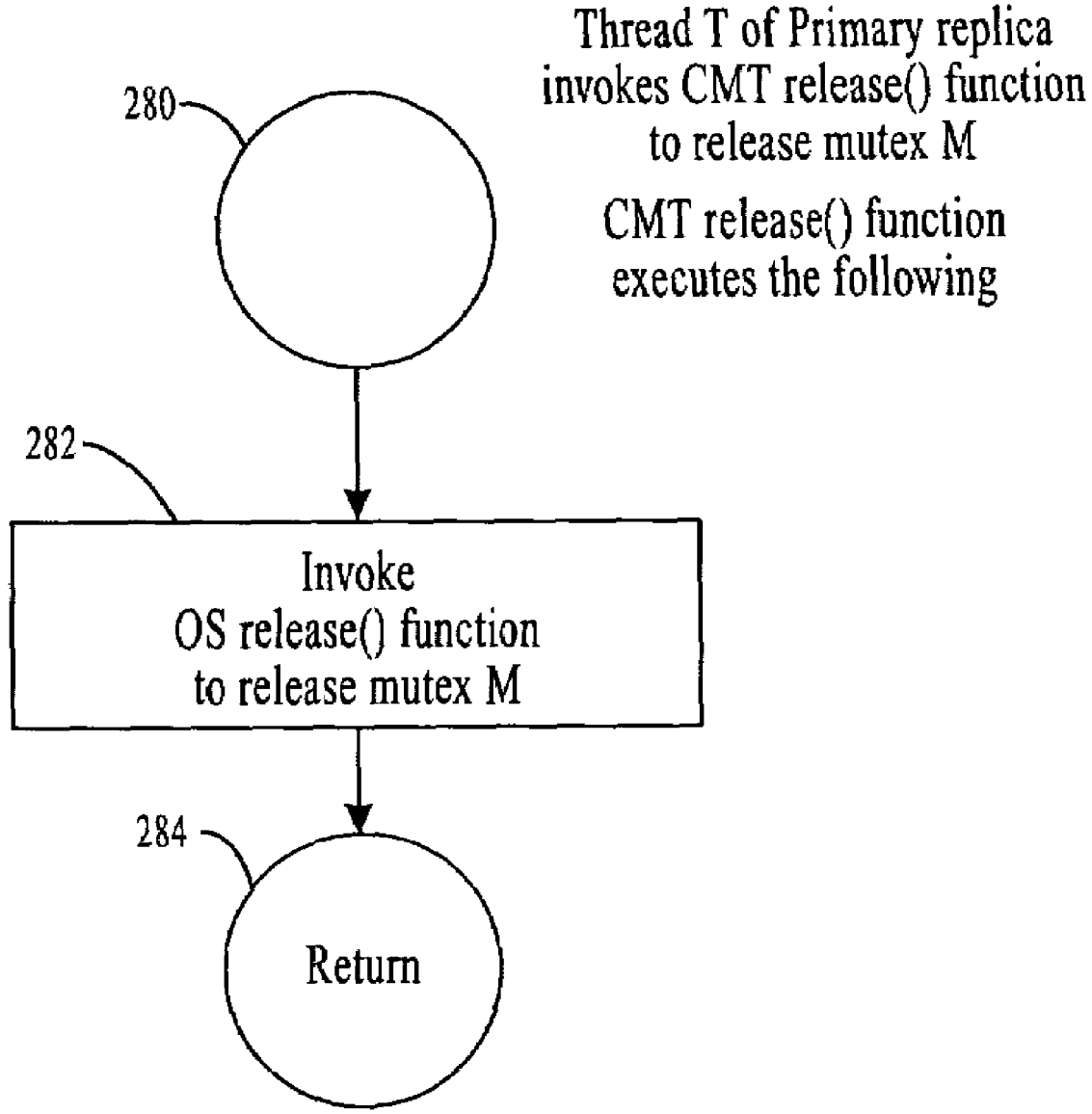
FIG. 11 is a flowchart of a thread of the primary replica invoking the CMT release( ) wrapper function for a mutex according to an aspect of the present invention, showing the steps taken by that function.

Thus, in FIG. 11, at the primary replica, when thread T invokes the CMT release( ) function 280 for mutex M, the CMT release( ) function invokes the release( ) function 282 of the operating system thread library for mutex M and then returns 284, allowing thread T to proceed.

Backup Replica Thread Invokes CMT Claim( ) Function to Claim a Mutex

At a backup replica, when a thread T invokes the CMT claim( ) function to claim a mutex M, the CMT claim( ) function executes the following steps:

```
determine (T, M, T.N, T.C)
labelA:
determine the first entry (T', N', C', X') in the M.orderedClaims queue
if T == T'
    set M.available to false
    invoke the claim( ) function of the OS thread library to claim mutex
        M for thread T
    if M is available, the OS grants M to T immediately
    if M is not available, the OS makes T wait for M
        (which activates the priority transfer mechanism)
    when T is granted its claim of M
        remove (T', N', C', X') from the M.orderedClaims queue
        assert C' == T.C
        assert N' == T.N
        if X' != NULL
            M.set_shared_data(X')
```

-continued

```
        M.C = T.C
        T.N = T.N+1
        resume T
else
    if C' < T'.C
        discard the first entry in the M.orderedClaims queue
        goto labelA
    else
        set T.suspended to true
        invoke suspend( ) function of OS thread library to suspend T
```

Figure 12:
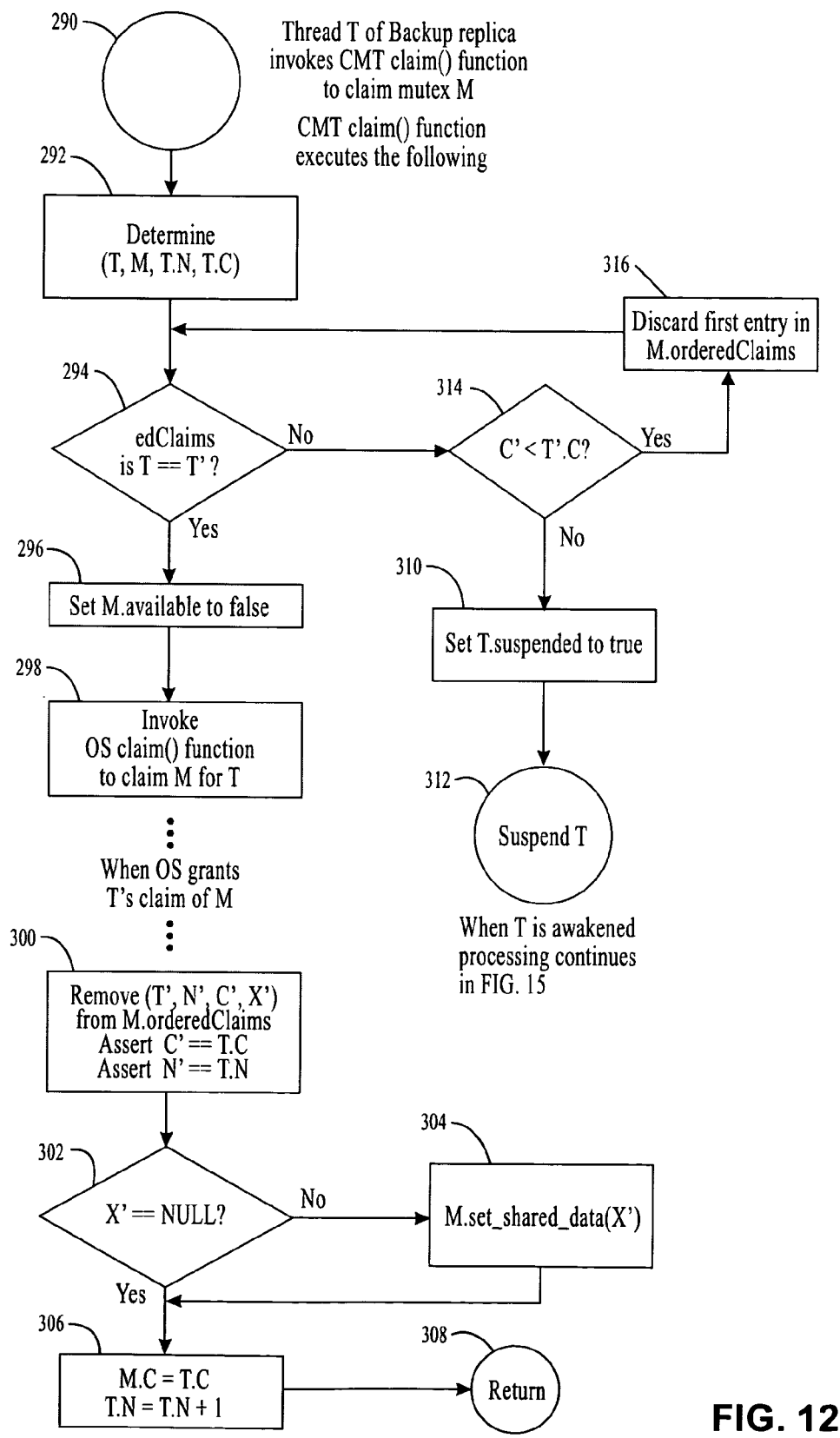
FIG. 12 is a flowchart of a thread of a backup replica invoking the CMT claim( ) function for a mutex according to an aspect of the present invention, showing the steps taken by that function.

Thus, in FIG. 12, in a backup replica, when thread T invokes the CMT claim( ) function 290 for mutex M, the CMT claim( ) function first determines (T, M, T.N, T.C) 292.

It then checks 294 whether the first entry (T', N', C', X') in the M.orderedClaims queue is such that T=T'.

If T=T', it sets M.available to false 296 and then invokes the claim( ) function 298 of the operating system thread library to claim mutex M for thread T. When T is granted its claim of M, the CMT claim( ) function then removes (T', N', C', X') from the M.orderedClaims queue 300. At that point, C' should equal T.C and N' should equal T.N.

If X' is not NULL 302, the CMT claim( ) function invokes the set_shared_data( ) method 304 for mutex M, with parameter X', so that the shared data protected by M can be set to the checkpointed values recorded in X'.

Lastly, the CMT claim( ) function sets the mutexCheckpointNumber M.C of the shared data protected by mutex M to the threadCheckpointNumber T.C obtained from thread T and increments T.N 306 and then returns 308.

If T≠T', the CMT claim( ) function checks 314 whether C'<T'.C, where T'.C is the threadCheckpointNumber for thread T'. If C' is less than T'.C, the entry is obsolete and the CMT claim( ) function discards that entry 316, and returns to labelA to reconsider the next entry in the M.orderedClaims queue 294. If C' is greater than or equal to T'.C, the CMT claim( ) function sets T.suspended to true 310 and invokes the suspend( ) function 312 of the operating system thread library to suspend thread T.

Backup Replica Thread Invokes the CMT Release( ) Function to Release a Mutex When a thread T of a backup replica invokes the CMT release( ) function to release mutex M, the CMT release( ) function executes the following steps:

```
invoke release( ) function of OS thread library to release mutex M
set M.available to true
labelB:
if the M.orderedClaims queue is not empty
    determine the first entry (T', N', C', X') in the
        M.orderedClaims queue
    if C' < T'.C
        discard the first entry in the M.orderedClaims queue
        goto labelB
    if T'.suspended
        invoke the signal( ) function of the OS thread library
            to awaken thread T'
```

Figure 13:
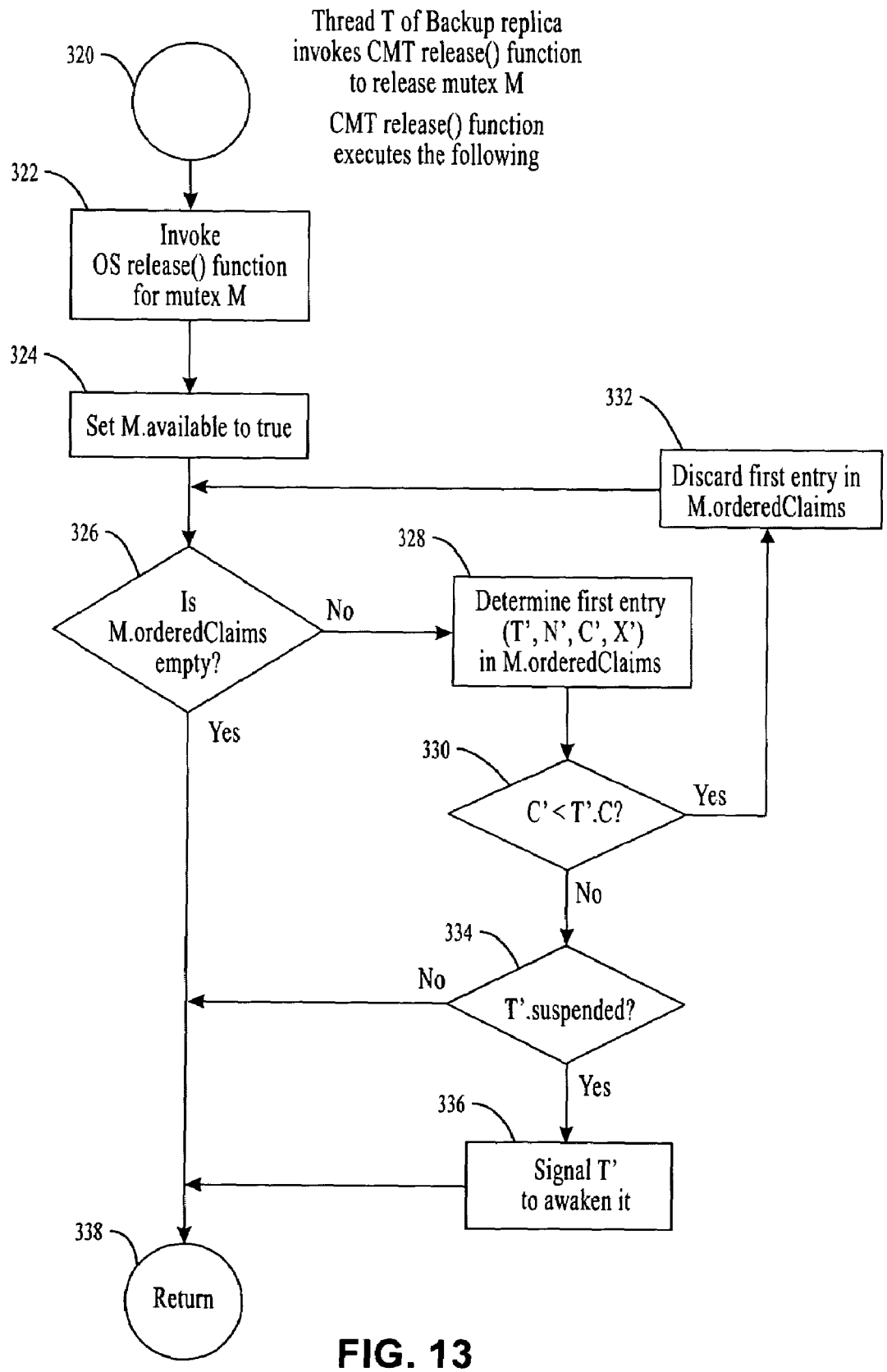
FIG. 13 is a flowchart of a thread of a backup replica invoking the CMT release( ) function for a mutex according to an aspect of the present invention, showing the steps taken by that function.

Thus, in FIG. 13, when a thread of a backup replica invokes the CMT release( ) function 320 for mutex M, the CMT release( ) function invokes the operating system thread library release( ) function 322 for mutex M and sets M.available to true 324. It then checks whether the M.orderedClaims queue is empty 326.

If the M.orderedClaims queue is not empty, the CMT release( ) function determines 328 the first entry (T', N', C', X') in the M.orderedClaims queue. Next, the CMT release( ) function 330 checks whether C'<T'.C, where T'.C is the threadCheckpointNumber for thread T'. If C' is less than T'.C, the entry is obsolete and the CMT release( ) function discards that entry 332, and returns to labelB to reconsider the next entry in the M.orderedClaims queue 326. If C' is greater than or equal to T'.C, the CMT release( ) function checks whether thread T' is suspended 334. If thread T' is suspended, the CMT release( ) function invokes the signal( ) function 336 of the OS thread library to awaken thread T' and then returns 338. Otherwise, it simply returns 338.

Backup Replica Receives OrderedClaims in a Message

When a backup replica receives a message with piggy-backed orderedClaims, the CMT mechanisms extract, in order, each orderedClaim (T, M, N, C, X) from the message and then execute the following steps:

```
append (T, N, C, X) to the M.orderedClaims queue
labelC:
determine the first entry (T', N', C', X') in the M.orderedClaims queue
if C' < T'.C
    discard the first entry in the M.orderedClaims queue
    goto labelC
else
    if M.available and T'.suspended
        invoke signal( ) function of OS thread library to awaken T'
```

Figure 14:
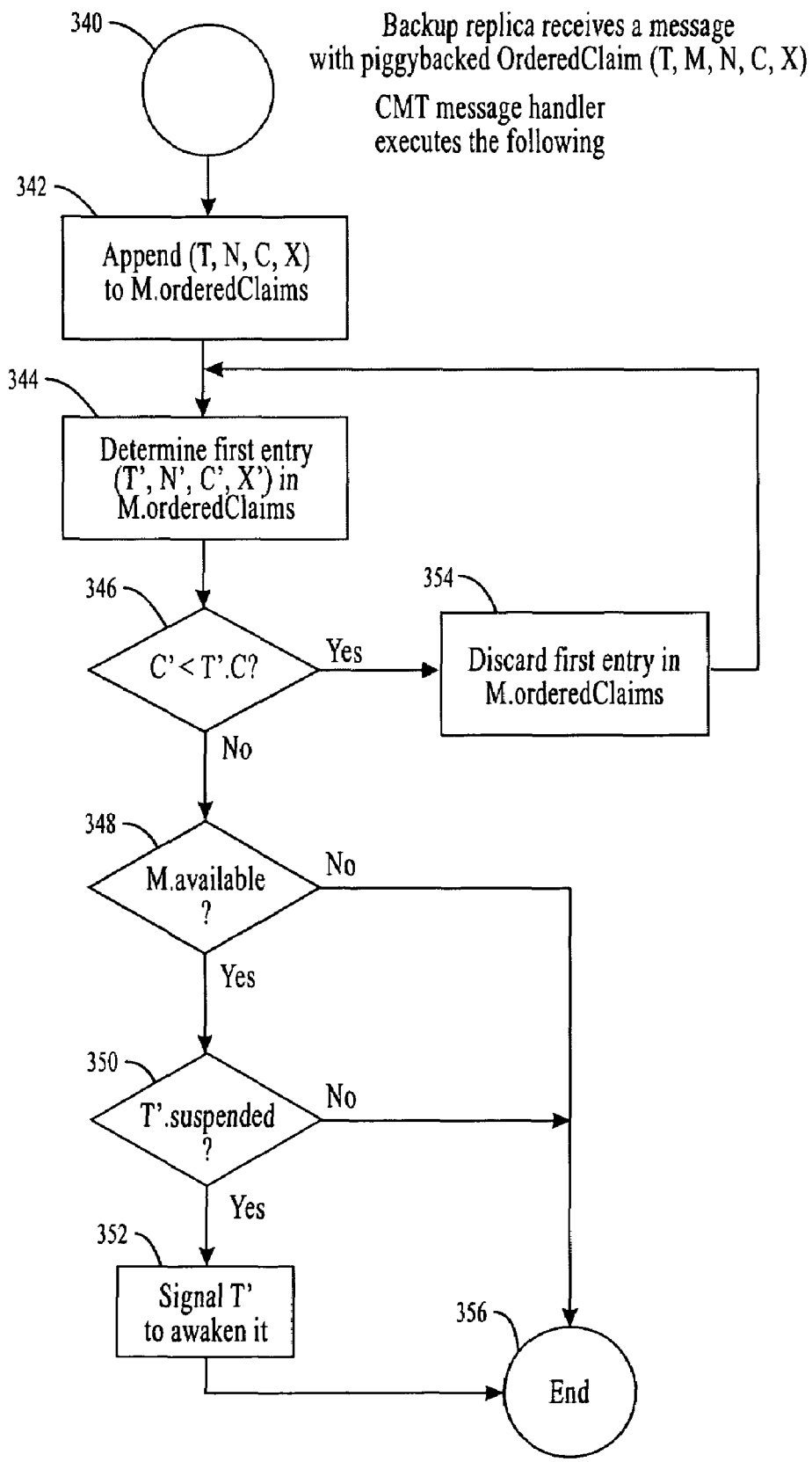
FIG. 14 is a flowchart of a backup replica receiving a message with piggybacked OrderedClaims according to an aspect of the present invention, showing the steps taken by the CMT mechanisms when they receive that message.

As shown in FIG. 14, when a backup replica receives 340 a message with piggybacked OrderedClaims, for each entry (T, M, N, C, X) extracted in order from that message, the CMT mechanisms append 342 the 4-tuple (T, N, C, X) to the M.orderedClaims queue. They then determine 344 the first entry (T', N', C', X') in the M.orderedClaims queue and check 346 whether C'<T'.C. If C' is less than T'.C, the CMT mechanisms discard the first entry in the M.orderedClaims queue and again proceeds to determine 344 the first entry in the M.orderedClaims queue. If C' is greater than or equal to T'.C, the CMT mechanisms check whether M is available 348 and T' is suspended 350. If M is available and T' is suspended, the CMT mechanisms invoke the signal( ) function of the OS thread library to awaken T' 352 and terminate 356. If M is not available or T' is not suspended, the CMT mechanisms do not process that entry any further but terminate 356.

Backup Replica Thread is Awakened

When a backup replica thread T is awakened while waiting for mutex M as claim T.N, the CMT claim( ) function executes the following:

```
if M.available
    labelD:
        determine the first entry (T', N', C', X')
            in the M.orderedClaims queue
        if T == T'
            assert T.C == C'
            T.suspended = false
            M.available = false
            invoke the OS thread library claim( ) function to claim M for T
            if M is available, the OS grants M to T immediately
            if M is not available, the OS makes T wait for M
                (which activates the priority transfer mechanism)
            when the OS grants M to T
                remove (T', N', C', X') from the M.orderedClaims queue
                if X' != NULL
                    M.set_shared_data(X')
                else{ }
                M.C = T.C
                T.N = T.N+1
        else
            if C' < T'.C
                discard the first entry in the M.orderedClaims queue
                goto labelD
            else
                invoke the suspend( ) function of OS thread library
                    to suspend T
else
    invoke the suspend( ) function of OS thread library to suspend T
```

Figure 15:
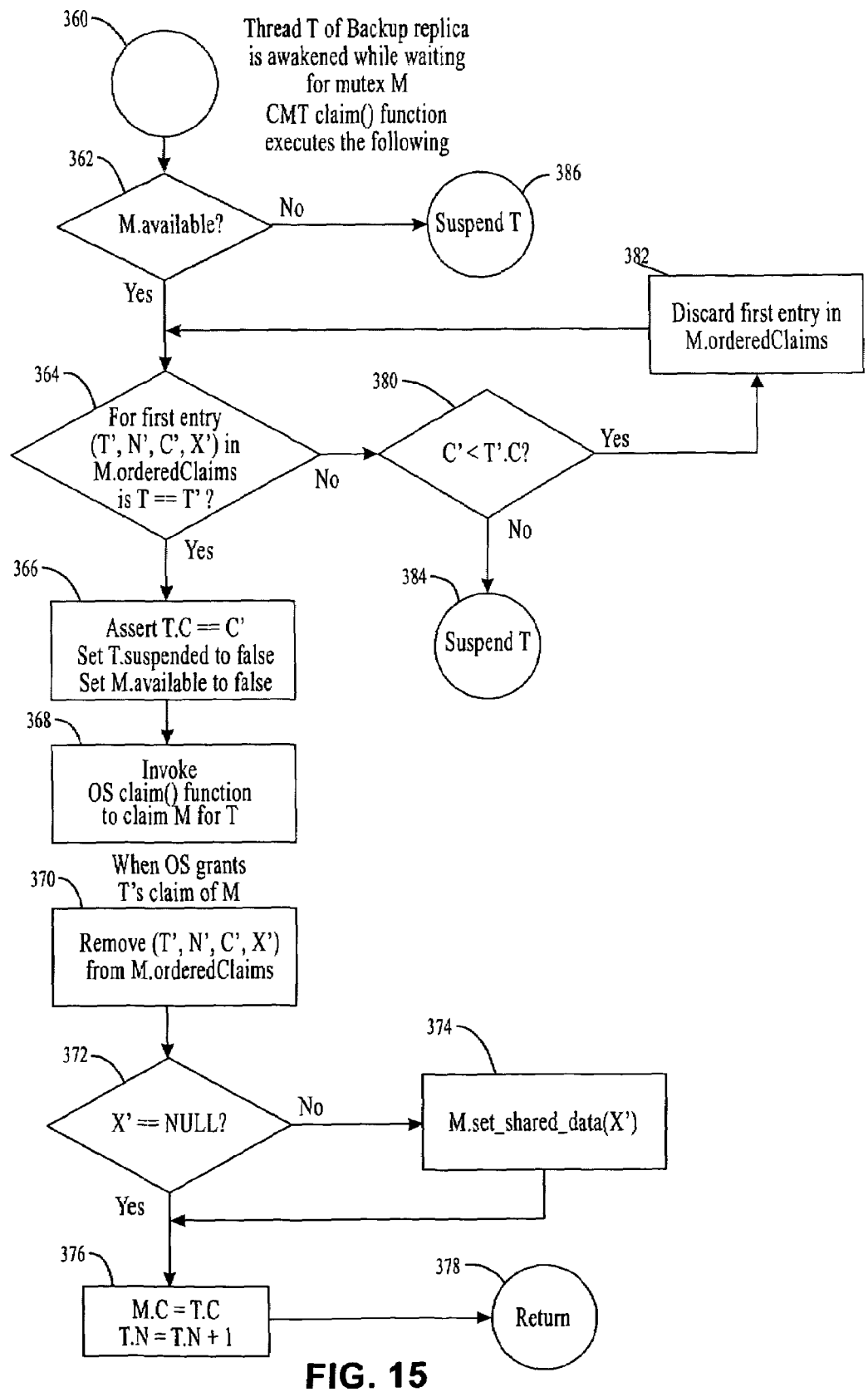
FIG. 15 is a flowchart of a thread of a backup replica that is awakened while waiting for a mutex according to an aspect of the present invention, showing the steps taken by the CMT claim( ) function.

Thus, in FIG. 15, when a thread T of a backup replica is awakened 360 while waiting for mutex M as claim N, the CMT claim( ) function checks 362 whether mutex M is available and then determines 364 whether T=T' for the first entry (T', N', C', X') in the M.orderedClaims queue.

If T=T', the threadCheckpointNumber T.C of thread T should equal the checkpoint number C' in the first entry 366. The CMT claim( ) function then sets T.suspended to false and M.available to false 366. It then invokes the claim( ) function 368 of the operating system thread library to claim mutex M for thread T. When the operating system grants mutex M to thread T, the CMT claim( ) function removes 370 the entry (T', N', C', X') from the M.orderedClaims queue.

If X' is not NULL 372, the CMT claim( ) function invokes the M.set_shared_data( ) method 374 with parameter X', so that the shared data protected by M can be set to the checkpoint X'. In any case, the CMT claim( ) function then sets the mutexCheckpointNumber M.C to the threadCheckpointNumber T.C and increments T.N 376 and then returns 378.

If T≠T' 364, the CMT claim( ) function checks 380 whether C'<T'.C, where T'.C is the threadCheckpointNumber for thread T'. If C' is less than T'.C, then the first entry in M.orderedClaims is obsolete and the CMT claim( ) function discards that entry 382 and branches to labelD to consider the next entry in the M.orderedClaims queue 364.

If C' is greater than or equal to T'.C, the CMT claim( ) function invokes the suspend( ) function 384 of the operating system thread library to suspend thread T. Similarly, if mutex M is not available, the CMT claim( ) function invokes the suspend( ) function 386 of the operating system thread library to suspend thread T.

Checkpointing and Restoration Methods

The checkpointing and restoration methods are described below.

The get_thread_state( ) Method

The get_thread_state( ) method is implemented for each invoked-checkpoint thread. It is invoked by the checkpoint infrastructure as a part of taking a checkpoint. Pseudocode for the get_thread_state( ) method is as follows:

```
ByteSequence get_thread_state( )
    ByteSequence X
    T.C = objectCheckpointNumber
    insert values of local variables of thread T into X
    return X
```

The get_thread_state( ) method first sets T.C to the current value of the objectCheckpointNumber. It then constructs a byte sequence X containing the values of the local variables of thread T, and returns the byte sequence X as the result of the method invocation.

The set_thread_state( ) Method

The set_thread_state( ) method is implemented for each invoked-checkpoint thread. It is invoked by the checkpoint infrastructure as a part of starting a thread from a checkpoint. Pseudocode for the set_thread_state( ) method is as follows:

```
void set_thread_state(ByteSequence X)
    T.C = objectCheckpointNumber
    extract values of local variables of thread T from X
    return
```

The set_thread_state( ) method first sets T.C to the current value of the objectCheckpointNumber. It then extracts the values of the local variables of thread T from the byte sequence X provided as the parameter of the method. Thread T is now ready to receive and process method invocations.

The record_thread_state( ) Method

The record_thread state( ) method is invoked by a self-checkpointing thread when it needs to record a checkpoint. Pseudocode for the record_thread_state( ) method is as follows:

```
void record_thread_state(ThreadId T, int c, ByteSequence X)
    record X as the checkpoint for the thread with thread identifier T
        and threadCheckpointNumber c
return
```

A typical usage of record_thread_state( ) is as follows:

```
if T.C < objectCheckpointNumber
    save the values of the local variables and global variables
        in checkpointStruct
    save the value of objectCheckpointNumber in checkpointStruct
    record_thread_state(T, threadCheckpointNumber,
        checkpointStruct)
```

First, the thread compares the threadCheckpointNumber T.C of the last checkpoint that thread T recorded with the particular objectCheckpointNumber. If threadCheckpointNumber T.C is less than objectCheckpointNumber, the local variables of the current method and the global variables that are specific to the thread are saved in the checkpoint structure. The objectCheckpointNumber is also saved in the checkpoint structure. The thread then invokes the record_thread_state( ) method of the checkpoint infrastructure with the thread identifier, the thread checkpoint number and the checkpoint structure.

The restore_thread_state( ) Method

The restore_thread_state( ) method of a self-checkpointing thread is invoked by the checkpoint infrastructure to prepare a thread for being started from a checkpoint. Pseudocode for restoring the state is as follows:

```
void restore_thread_state(ByteSequence X)
    T.C = objectCheckpointNumber
    T.restoringCheckpoint = true
    extract the checkpointStruct of thread T from X
    return
```

The restore_thread_state( ) method first sets T.C to the objectCheckpointNumber, and then sets the flag T.restoringCheckpoint to true to indicate that the thread is restarting from a checkpoint. The method then extracts the thread's checkpoint structure from the byte sequence parameter X of the method, and returns. The thread is actually restarted by reinvoking the last invocation of the thread. Code inserted into the self-checkpointing thread ensures that the thread does not repeat all of the processing that the thread already performed but, rather, restores values of variables from the checkpoint structure and resumes normal processing at the point at which the checkpoint was taken.

The get_shared_data( ) Method

This method is invoked by the CMT claim( ) function of the mutex that controls access to the shared data, and is provided by the application programmer or by a source-code preprocessor tool. It collects the values of the shared data and packs them into a compact form, such as a byte sequence, for checkpointing.

The set_shared_data( ) Method

This method is invoked by the CMT claim( ) function of the mutex that controls access to the shared data, and is provided by the application programmer or by a source-code preprocessor tool. It unpacks the checkpointed data from its compact representation and assigns the values to the shared data variables.

Preparing a Program for Checkpointing

The process of preparing the source code of the application program for checkpointing involves cooperation between the application programmer and the source-code preprocessor tool. The pseudocode for that cooperation is shown below and is illustrated in FIG. 16 and FIG. 17.

The tool analyzes the control flow graph to identify all loops. For each such loop, from the number and kinds of statements within the loop, it estimates the duration of a single iteration of the loop. It then determines if the loop is of long duration. It can determine the maximum number of iterations of the loop, and preferably consults the application programmer in this determination. If the time estimated for the maximum number of iterations exceeds an application-determined limit, provided by the application programmer, then the loop is regarded as a loop of long duration.

```
constrct the control flow graph for the application program
perform a transitive reachability analysis on the control flow graph
identify all loops of long duration
for each loop of long duration
    report the loop to the application programmer
    with the assistance of the application programmer
        insert an invocation of record_thread_state( ) into the loop
for each thread T
    if thread T is self-checkpointing
        insert the restore_thread_state( ) method for thread T
    else
        insert the get_thread_state( ) and set_thread_state( ) methods
            for thread T
    allocate space for the global variables of thread T
        in the checkpointStruct for thread T
for each program section S
    assign a unique identifier s to S
    if a statement of the form record_thread_state( ) is reachable from
    S
        set s.containsCheckpoint to true
        perform the program transformations on S
    else
        set s.containsCheckpoint to false
```

Figure 16:
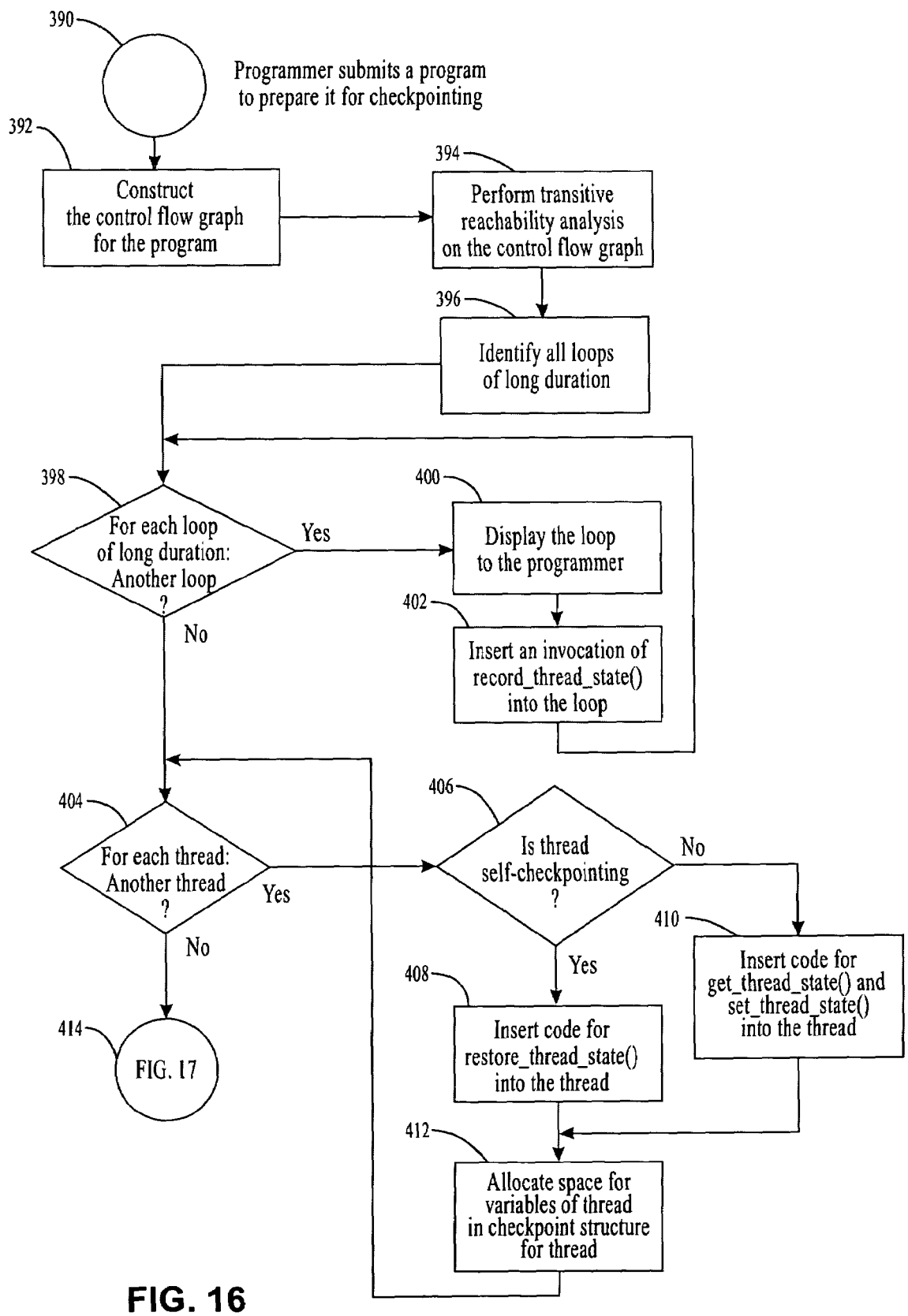
FIG. 16 and FIG. 17 are a flowchart of the process of preparing the source code of an application program for checkpointing according to an aspect of the present invention, showing the cooperation involved between the application programmer and the source-code preprocessor tool.
Figure 17:
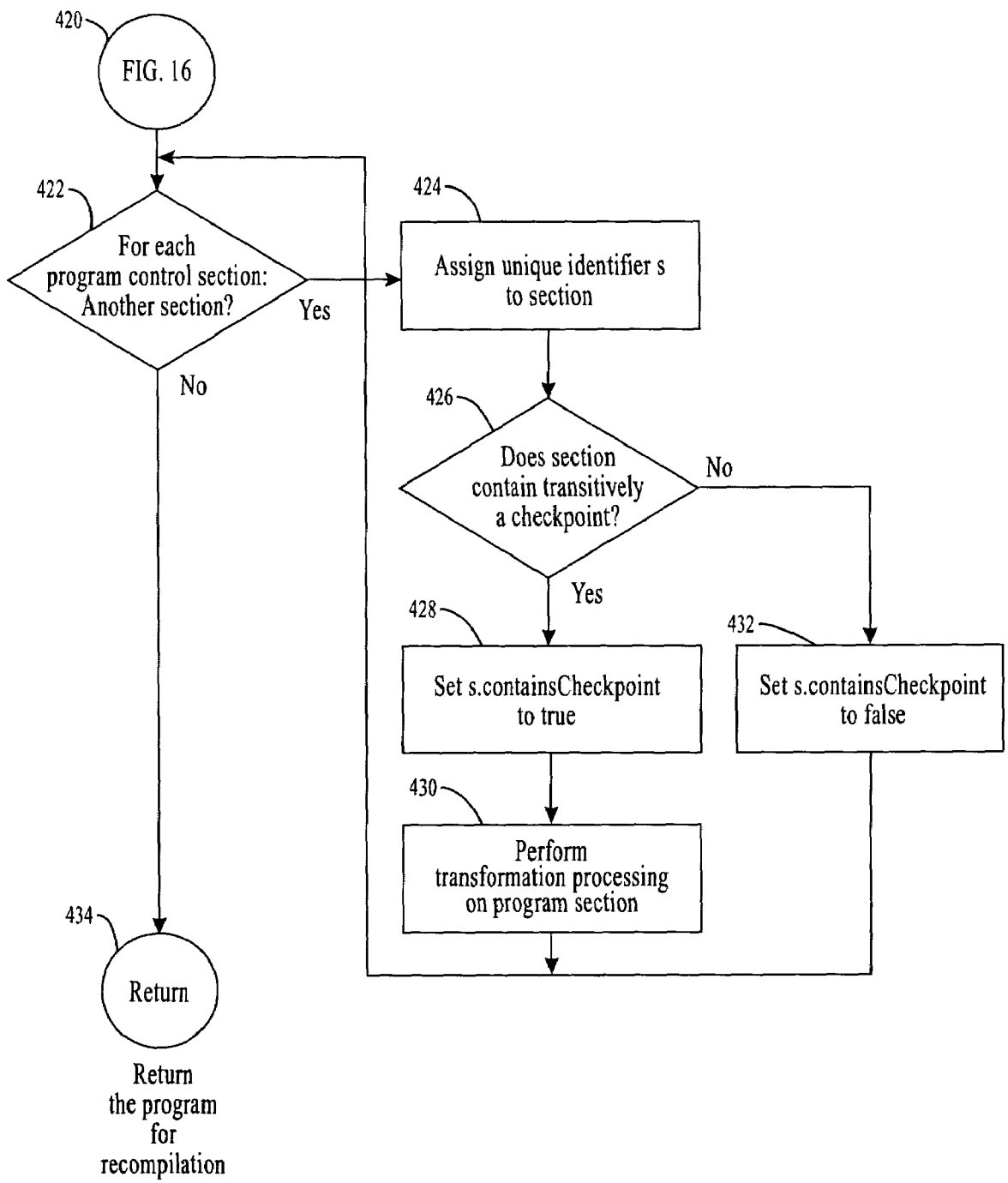

As shown in FIG. 16, the application programmer submits the source code of the application program to the source-code preprocessor tool at block 390. The tool parses the program source code and constructs a control flow graph for the program 392, using technology that is well known in the art. The tool also performs a transitive reachability analysis on the control flow graph 394, again using technology that is well known in the art, and then identifies all loops of long duration 396.

For each loop of long duration at block 398, the tool displays the loop to the application programmer 400. The tool or the application programmer chooses a point within the loop, and the tool inserts an invocation of the record_thread_state( ) method into the loop 402.

Next, for each thread of the application program 404, the tool determines whether the thread can invoke the record_thread_state( ) method. If so, the thread is a self-checkpointing thread at block 406; otherwise, the thread is an invoked-checkpoint thread.

For each self-checkpointing thread, the tool inserts the source code of the restore_thread_state( ) method into the source code for the thread 408. For each invoked-checkpoint thread, the tool inserts the source code for the get_thread_state( ) and set_thread_state( ) methods into the source code for the thread 410. Some threads, such as the threads of a thread pool, share common code. For such threads, a single insertion of restore_thread_state( ), or of get_thread_state( ) and set_thread_state( ), into the common code suffices. Technology for processing the source code of a program, to generate additional source code for methods, such as get_thread_state( ) and set_thread_state( ), is well known in the art.

For each self-checkpointing thread, the checkpoint infrastructure employs a checkpoint structure in a compact form such as a byte sequence. During the preparation of the program, the tool determines which data must be checkpointed for each self-checkpointing thread and, thus, the checkpoint structure for that thread.

As a part of the processing for each thread, the tool determines the global variables of the thread and assigns space for them in the checkpoint structure for the thread at block 412. Data that are shared between several threads must be protected by a mutex, and are checkpointed as a part of claiming that mutex. Variables that are local to a method, within the processing of the thread, are checkpointed as a part of the method invocation.

The flow chart of FIG. 16 at block 414 is continued in FIG. 17 at block 420.

For each program section that has been determined by the parsing and control flow analysis of the program source code at block 422, the tool assigns a unique identifier s to that program section 424. The tool then determines, from the transitive flow analysis, whether an invocation of the record_thread_state( ) method can be reached from that program section at block 426. If yes, s.containsCheckpoint is set to true 428; if no, s.containsCheckpoint is set to false 432. For each program section S, for which s.containsCheckpoint is set to true, the tool performs a source code transformation 430, replacing the original program source code S by new source code, as defined below for each kind of program section. Once all sections of the program have been processed, the tool returns the modified source code of the program for recompilation 434.

Accordingly, it can be seen that the mechanisms of this invention allow threads of objects, processes or other components of multithreaded application programs to be asynchronously checkpointed and restored in a system subject to semi-active or passive replication. Different threads and different areas of shared data being checkpointed at different times without the need to suspend all threads of a process, object or other component to take a checkpoint. Ordering information for the mutexes, and checkpoint information for the shared data, are communicated from the primary replica to the backup replicas by piggybacking that information on regular messages. At a backup replica, the checkpoint information is used to restore the values of the shared data as the backup replica claims the mutexes for the shared data. A checkpoint number identifier is utilized in comparisons with stored checkpoint identifiers to determine when a new checkpoint needs to be generated. Shared data, controlled by mutexes or other access control mechanisms, are checkpointed as needed to ensure consistent operation of the threads of an object, process or other component. The preferred mechanism for implementing the checkpointing functionality described is by way of wrapper functions within a multithreading library, such as within the Consistent Multithreading (CMT) library, for the mutex claim and release functions of the operating system thread library. Alternatives for incorporating the functionality include integrating it within the operating system or application layers. It should be appreciated that aspects of the invention and pseudo-code have been described by way of example, wherein one of ordinary skill in the art may modify numerous details without departing from the teachings of the present invention. In addition, the functions performed by a given method is often recited in the specification within the method label, so for example "get_shared_data( )" in the specification describes a method for getting shared data. It should be appreciated that the description and examples herein are not limited in scope to specific method names.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A method of checkpointing objects, processes or components of a multithreaded application program subject to semi-active or passive replication strategies, comprising:
   controlling access to shared data by threads of said objects, processes or component, which claim mutexes to gain access to said shared data;
   separately checkpointing the local state of each of said threads and each data shared between threads where said shared data are protected by a mutex; and
   piggybacking mutex ordering information and checkpoints for shared data onto regular messages so that the values of the shared data of replicas receiving said messages can be restored from said checkpoint.

2. A method as recited in claim 1:
   wherein said mutex provides said thread with exclusive access to said data; and
   wherein said thread releases said mutex when it has finished accessing said data, whereby another thread is allowed to access said shared data.

3. A method as recited in claim 1, wherein said mutex functions comprise claim and release functions.

4. A method as recited in claim 1, wherein said mutex functions are contained in a multithreading library interposed ahead of an operating system thread library, said multithreading library containing wrapper functions for the functions of the operating system thread library that claim and release mutexes, semaphores and condition variables, and a checkpoint infrastructure.

5. A method as recited in claim 1, wherein said checkpointing for different threads is asynchronous.

6. A method as recited in claim 1, wherein said checkpointing of thread state is internally initiated for self-checkpointing threads and externally initiated for invoked-checkpoint threads.

7. A method as recited in claim 1, wherein said checkpointing is not generated for shared data if the values of said shared data have already been generated as part of a specific checkpoint.

8. A method as recited in claim 1, wherein interactions between threads through shared data are recorded in said checkpoints.

9. A method as recited in claim 8, wherein said interactions are replayed during restoration from a checkpoint.

10. A method as recited in claim 1, further comprising:
    maintaining for each object, a monotonically increasing object checkpoint number corresponding to the most recent checkpoint that said checkpoint infrastructure requested for said object; and
    wherein said checkpoint number is written by said checkpoint infrastructure and is read by the threads of said object.

11. A method as recited in claim 10, wherein a mutex checkpoint number is generated in response to the most recent checkpoint of said shared data.

12. A method as recited in claim 11, wherein a thread checkpoint number is generated in response to the most recent checkpoint of said thread.

13. A method as recited in claim 12, wherein said generation of said checkpoint number for the shared data is determined by a comparison between the mutex checkpoint number for the mutex protecting said shared data and the thread checkpoint number for the thread claiming said mutex.

14. A method as recited in claim 12, wherein said generation of said checkpoint number for a self-checkpointing thread is determined by periodically comparing the thread checkpoint number for the thread with the object checkpoint number to establish that said checkpoint infrastructure has initiated a new checkpoint of said object.

15. A method as recited in claim 10, wherein application object replicas comprise a primary replica which determines the order of message processing and mutex claiming and one or more backup replicas which follow the decisions of said primary replica.

16. A method as recited in claim 15, wherein said mutexes are granted to said threads at said backup replica in the order determined by said primary replica.

17. A method as recited in claim 16, wherein a backup replica restores the state of shared data when threads claim mutexes.

18. A method as recited in claim 15, wherein a claim wrapper function protects said shared data in said primary replica and when said wrapper function is invoked by a thread to claim said mutex and to access said shared data, said wrapper function determines whether said shared data needs to be checkpointed.

19. A method as recited in claim 18, wherein when a thread of said backup replica needs to access shared data and said thread invokes said claim function of said mutex that protects said shared data, said claim function determines that checkpoint information is available for said shared data and sets the values of said shared data according to said checkpoint information.

20. A method as recited in claim 15:
    wherein a backup replica can start from a checkpoint with a specific object checkpoint number, generated by a primary replica and transferred to said backup replica;
    wherein each of said threads of said backup replica is started from part of said checkpoint of the corresponding thread of said primary replica, and with thread checkpoint number equal to said object checkpoint number; and
    wherein each of said shared data is restored from part of said checkpoint of the corresponding shared data in said primary replica, and with mutex checkpoint number equal to said object checkpoint number.

21. A method as recited in claim 20, wherein said backup replica, when restarted from a checkpoint, reproduces the processing performed by said primary replica, and generates the same replies as said primary replica.

22. A computer system upon which multithreaded application objects are replicated using the semi-active or passive replication strategies, said computer system comprising:
    replication infrastructure software, embodied on a computer readable medium, executable on one or more networked computers in said system for creating a primary replica and one or more backup replicas; and means associated with said replication infrastructure software for checkpointing said primary replica, having multiple threads, wherein checkpoints are generated separately for the local state of each thread and for each shared data shared between said threads and protected by a mutex, and for restoring the threads and the shared data in a backup replica from said checkpoints;

maintaining for each object, a monotonically increasing object checkpoint number corresponding to the most recent checkpoint that said checkpoint infrastructure requested for said object;

wherein said checkpoint number is written by said checkpoint infrastructure and is read by the threads of said object.

23. A computer system as recited in claim 22, wherein a mutex checkpoint number is generated in response to the most recent checkpoint of said shared data.

24. A computer system as recited in claim 23, wherein a thread checkpoint number is generated in response to the most recent checkpoint of said thread.

25. A computer system as recited in claim 24, wherein generation of a checkpoint for the shared data is determined by a comparison between the mutex checkpoint number for the mutex protecting said shared data and the thread checkpoint number for the thread claiming said mutex.

26. A computer system as recited in claim 24, wherein generation of a checkpoint for a self-checkpointing thread is determined by periodically comparing the thread checkpoint number for the thread with the object checkpoint number to establish that said checkpoint infrastructure has initiated a new checkpoint of said object.

27. A computer system upon which multithreaded application objects are replicated using the semi-active or passive replication strategies, said computer system comprising:

replication infrastructure software, embodied on a computer readable medium, executable on one or more networked computers in said system for creating a primary replica and one or more backup replicas; and means associated with said replication infrastructure software for checkpointing said primary replica, having multiple threads, wherein checkpoints are generated separately for the local state of each thread and for each shared data shared between said threads and protected by a mutex, and for restoring the threads and the shared data in a backup replica from said checkpoints;

wherein checkpoints for shared data are transferred by piggybacking mutex ordering information and checkpoints onto regular messages.

28. A computer system upon which multithreaded application objects are replicated using the semi-active or passive replication strategies, said computer system comprising:

replication infrastructure software, embodied on a computer readable medium, executable on one or more networked computers in said system for creating a primary replica and one or more backup replicas; and means associated with said replication infrastructure software for checkpointing said primary replica, having multiple threads, wherein checkpoints are generated separately for the local state of each thread and for each shared data shared between said threads and protected by a mutex, and for restoring the threads and the shared data in a backup replica from said checkpoints;

wherein checkpointing thread state is internally initiated for self-checkpointing threads and externally initiated for invoked-checkpoint threads.

29. A computer system as recited in claim 27, 28 or 22, wherein said primary replica determines the order of message processing and mutex ordering, and said backup replicas follow the decisions of said primary replica.

30. A computer system as recited in claim 27, 28 or 22:

wherein said threads share data and in which access to said shared data is controlled by mutexes which are claimed by said threads to gain access to said shared data;

wherein said mutex provides said thread with exclusive access to said shared data;

wherein said mutexes are granted to said threads at said backup replica in the order determined by said primary replica; and wherein said thread releases said mutex when it has finished accessing said shared data, allowing another thread to access said shared data;

wherein said mutex functions comprise claim and release functions.

31. A computer system as recited in claim 27, 28, or 22, wherein a consistent multithreading library contains wrapper functions for the functions of the operating system thread library that claim and release mutexes, semaphores and condition variables and where said consistent multithreading library is interposed ahead of said operating system thread library.

32. A computer system as recited in claim 27, 28, or 22, wherein generating checkpoints for different threads is asynchronous.

33. A computer system as recited in claim 27, 28, or 22, wherein checkpointing is not performed for shared data if the values of said shared data have already been generated as part of a specific checkpoint.

34. A computer system as recited in claim 27, 28, or 22:

wherein interactions between threads through shared data are recorded in said checkpoints;

wherein said interactions are replayed during restoration from a checkpoint.

35. A computer system as recited in claim 27, 28, or 22, wherein a backup replica restores the state of shared data when threads claim mutexes.

36. A computer system as recited in claim 27, 28, or 22, wherein a wrapper function associated with a claim function of said mutex providing access to said shared data determines when to checkpoint said shared data.

37. A computer system as recited in claim 36, wherein when a backup replica invokes a claim function of a mutex to claim access to shared data mutex, said wrapper function determines that a checkpoint is available for said shared data and sets the values of said shared data to said checkpoint.

38. A computer program, embodied on a computer readable medium, executable on one or more computers in a system of networked computers wherein multithreaded application objects, containing multiple threads executing concurrently and asynchronously, are replicated using semi-active or passive replication, said program comprising:

a plurality of executable procedures configured to maintain consistency of a new object replica and existing object replicas by checkpointing threads and shared data of one of said existing object replicas using a checkpoint infrastructure and by restoring the threads and the shared data in a backup replica from said checkpoints;

maintaining for each object, a monotonically increasing object checkpoint number corresponding to the most recent checkpoint that said checkpoint infrastructure requested for said object; and wherein said checkpoint number is written by said checkpoint infrastructure and is read by the threads of said object.

39. A computer program as recited in claim 38, wherein a mutex checkpoint number is generated in response to the most recent checkpoint of said shared data.

40. A computer program as recited in claim 38, wherein a thread checkpoint number is generated in response to the most recent checkpoint of said thread.

41. A computer program as recited in claim 40, wherein said generation of a checkpoint for the shared data is determined by a comparison between the mutex checkpoint number for the mutex protecting said shared data and the thread checkpoint number for the thread claiming said mutex.

42. A computer program as recited in claim 38, wherein said generation of said checkpoint for a self-checkpointing thread is performed in response to periodically comparing the thread checkpoint number for the thread with the object checkpoint number and determining if said checkpoint infrastructure has initiated a new checkpoint of said object.

43. A computer program, embodied on a computer readable medium, executable on one or more computers in a system of networked computers wherein multithreaded application objects, containing multiple threads executing concurrently and asynchronously, are replicated using semi-active or passive replication, said program comprising:

a plurality of executable procedures configured to maintain consistency of a new object replica and existing object replicas by checkpointing threads and shared data of one of said existing object replicas using a checkpoint infrastructure and by restoring the threads and the shared data in a backup replica from said checkpoints;

wherein said checkpoints are generated separately for the local state of each thread of said threads and for each shared data shared between said threads and protected by a mutex; and wherein checkpoints for shared data are transferred by piggybacking mutex ordering information and checkpoints onto regular messages.

44. A computer program as recited in claim 43 or 38, wherein said primary replica determines the order of message processing and mutex granting, and backup replicas follow the decisions of said primary replica.

45. A computer program as recited in claim 43 or 38:

wherein said threads share data and in which access to said shared data is controlled by mutexes which are claimed by said threads to gain access to said shared data;

wherein said mutex provides said thread with exclusive access to said shared data;

wherein said mutexes are granted to said threads at said backup replica in the order determined by said primary replica; and wherein said thread releases said mutex when it has finished accessing said shared data, allowing another thread to access said shared data;

wherein said mutex functions comprise claim and release functions.

46. A computer program as recited in claim 45, wherein a multithreading library contains wrapper functions for the functions of the operating system thread library that claim and release mutexes, semaphores and condition variables and where said multithreading library is interposed ahead of said operating system thread library.

47. A computer program as recited in claim 45, wherein a wrapper function associated with a claim function of said mutex providing access to said shared data determines when to checkpoint said shared data.

48. A computer program as recited in claim 46, wherein when a backup replica invokes a claim function of a mutex to claim access to shared data, said wrapper function determines that a checkpoint is available for said shared data and sets the values of said shared data to said checkpoint.

49. A computer program as recited in claim 43 or 38, wherein the generation of checkpoints for thread state is internally initiated for self-checkpointing threads and externally initiated for invoked-checkpoint threads.

50. A computer program as recited in claim 43 or 38, wherein a checkpoint is not generated for shared data if the values of said shared data have already been generated as part of a specific checkpoint.

51. A computer program as recited in claim 43 or 38:

wherein interactions between threads through shared data are recorded in said checkpoints; and wherein said interactions are replayed during restoration from a checkpoint.

52. A computer program as recited in claim 43 or 38, wherein a backup replica restores the state of shared data when threads claim mutexes.

53. A computer program, embodied on a computer readable medium, comprising:

executable code structured as application objects that contain multiple threads that execute concurrently and asynchronously;

wherein said code is configured to checkpoint a primary replica of said application object and to restore a backup replica from said checkpoint, maintaining consistency between the corresponding threads of said primary replica and said backup replica;

wherein said threads share data and in which access to each said shared data is controlled by a mutex that is claimed by said threads; and wherein said shared data can be accessed and modified both by threads that have already generated a specific checkpoint and by threads that have not yet generated that specific checkpoint.

54. A computer program as recited in claim 53, wherein when said backupreplica is restarting from a specific checkpoint, the modifications to said shared data that were made by a thread of said primary replica that had not yet generated said specific checkpoint are communicated as a part of a checkpoint to said backup replica, so that said backup replica uses the modified shared data that said primary replica used, without the need for corresponding thread of said backup replica to repeat the processing performed prior to said specific checkpoint.

55. A computer program as recited in claim 54, wherein shared data that are not accessed by any thread are checkpointed.

56. A computer program as recited in claim 55, wherein for each shared data, said checkpoint infrastructure claims and releases the mutex that provides exclusive access to said shared data, thus causing said shared data to be checkpointed.

57. A computer program as recited in claim 56, wherein said claiming and releasing of said mutexes for shared data is performed by said checkpoint infrastructure as a low priority background activity.

58. A computer program as recited in claim 54:
wherein said threads are classified as stateless threads, invoked-checkpoint threads and self-checkpointing threads;
wherein said checkpoint infrastructure generates a checkpoint by invoking, for each invoked-checkpoint thread, a method for getting the state of said thread; and
wherein each self-checkpointing thread generates its checkpoint by invoking a method of recording thread state of said checkpoint infrastructure.

59. A computer program, embodied on a computer readable medium, comprising:
executable code structured as application objects that contain multiple threads that execute concurrently and asynchronously;
wherein said code is configured to checkpoint the primary replica of said application object and to restore said backup replica from said checkpoint, maintaining consistency between the corresponding threads of said primary replica and said backup replica; and
wherein a monotonically increasing object checkpoint number is maintained for each object corresponding to the most recent checkpoint that said checkpoint infrastructure requested for said object.

60. A computer program as recited in claim 59:
wherein said threads share data and in which access to said shared data is controlled by mutexes that are claimed by said threads;
wherein each shared data, or mutex protecting said shared data, records a mutex checkpoint number corresponding to the most recent checkpoint for which said shared data have been checkpointed.

61. A computer program as recited in claim 59, wherein each thread records a thread checkpoint number corresponding to the most recent checkpoint for which said thread has generated a checkpoint.

62. A computer program as recited in claim 61, wherein the program code for a claim wrapper function of a mutex that is protecting shared data, determines whether to generate a checkpoint for said shared data by comparing the mutex checkpoint number corresponding to the most recent checkpoint for said shared data that said mutex has generated and the thread checkpoint number corresponding to the most recent checkpoint that said thread has generated.

63. A computer program as recited in claim 61, wherein a self-checkpointing thread of an object determines whether to generate a checkpoint by comparing its thread checkpoint number, corresponding to the most recent checkpoint that said thread has generated, and the object checkpoint number, corresponding to the most recently requested checkpoint of said object.

64. A computer program as recited in claim 61:
wherein the program code for a claim wrapper function of a mutex that is protecting shared data determines whether to generate a checkpoint for said shared data;
wherein the program code for said claim wrapper function of said mutex that is protecting said shared data determines whether to generate a checkpoint for said shared data by comparing the mutex checkpoint number corresponding to the most recent checkpoint for said shared data that said mutex has generated and the thread checkpoint number corresponding to the most recent checkpoint that said thread has generated.

65. A computer program as recited in claim 53 or 59, wherein said backup replica, when restored from a checkpoint, reproduces the processing performed by said primary replica, and generates the same replies as said primary replica, even though the threads at said replicas execute concurrently and asynchronously.

66. A computer program as recited in claim 53 or 59, wherein said application program is replicated using semi-active or passive replication.

67. A computer program as recited in claim 53 or 59, wherein said threads share data and in which access to each said shared data is controlled by a mutex that is claimed by said threads.

68. A computer program as recited in claim 67, wherein said application object is replicated using semi-active or passive replication, and in which said primary replica determines the order in which said mutexes are granted to said threads and communicates said order to said backup replicas, which grants mutexes to threads in the same order as said primary replica.

69. A computer program as recited in claim 67, wherein data to be included in a checkpoint comprises data that are local to the individual threads and data that are shared between the threads.

70. A computer program as recited in claim 67:
wherein a thread must claim a mutex before it can access said shared data;
wherein said mutex provides said thread with exclusive access to said data; and
wherein said thread must release said mutex when it has finished accessing said data, so that another thread can access said data.

71. A computer program as recited in claim 70, further comprising a claim wrapper function of said mutex protecting said shared data in said primary replica, that when invoked by a thread to claim said mutex and to access said shared data, determines if said shared data needs to be checkpointed.

72. A computer program as recited in claim 71, wherein a checkpoint of said shared data is generated and communicated by said primary replica to said backup replica along with said mutex ordering information generated by said primary replica to inform said backup replica about the order in which mutexes are to be granted to said threads of said backup replica.

73. A computer program as recited in claim 72, wherein when a thread of said backup replica needs to access shared data and said thread invokes said claim function of said mutex that protects said shared data, said claim function obtains a checkpoint for said shared data along with said mutex ordering information generated by said primary replica to inform said backup replica about the order in which mutexes are to be granted to threads of said backup replica.

74. A computer program as recited in claim 73, wherein if the values of said shared data have already been generated as part of a specific checkpoint, then those values are not generated a second time as part of said specific checkpoint.

75. A computer program, embodied on a computer readable medium, comprising:
executable code structured as application objects that contain multiple threads that execute concurrently and asynchronously to perform;
wherein said code is configured to checkpoint a primary replica of said application object and to restore a backup replica from said checkpoint, maintaining consistency between the corresponding threads of said primary replica and said backup replica;
wherein said threads share data and in which access to each said shared data is controlled by a mutex that is claimed by said threads;

wherein a thread must claim a mutex before it can access said shared data;

wherein said mutex provides said thread with exclusive access to said data;

wherein said thread must release said mutex when it has finished accessing said data, so that another thread can access said data; and a claim wrapper function of said mutex protecting said shared data in said primary replica, that when invoked by a thread to claim said mutex and to access said shared data, determines if said shared data needs to be checkpointed;

wherein a checkpoint of said shared data is generated and communicated by said primary replica to said backup replica alone with said mutex ordering information generated by said primary replica to inform said backup replica about the order in which mutexes are to be granted to said threads of said backup replica; and wherein when a thread of said backup replica needs to access shared data and said thread invokes said claim function of said mutex that protects said shared data, said claim function determines that a checkpoint is available for said shared data and sets the values of said shared data according to said checkpoint.

* * * * *